United States Patent

Pryor

[11] 3,861,479
[45] Jan. 21, 1975

[54] TARE ENTRY CIRCUITRY FOR A COMPUTING SCALE

[75] Inventor: Edward G. Pryor, Toledo, Ohio

[73] Assignee: Reliance Electric Company, Toledo, Ohio

[22] Filed: Apr. 17, 1974

[21] Appl. No.: 461,516

[52] U.S. Cl. .......... 177/25, 235/151.33, 235/61 PS, 177/3
[51] Int. Cl............................................ G01g 19/04
[58] Field of Search ....................... 177/1, 3, 25, 50; 235/61 PS, 157.33

[56] References Cited
UNITED STATES PATENTS

| | | | |
|---|---|---|---|
| 3,329,807 | 7/1967 | Currie et al. | 177/3 |
| 3,665,169 | 5/1972 | Henderson | 177/25 |
| 3,725,656 | 6/1973 | Fukuma | 177/25 |
| 3,740,536 | 6/1973 | Takahashi | 235/151.33 |
| 3,769,498 | 10/1973 | Hino | 235/151.33 |
| 3,770,069 | 11/1973 | Loshbough | 177/1 |

Primary Examiner—Richard B. Wilkinson
Assistant Examiner—Vit M. Miska
Attorney, Agent, or Firm—Thomas H. Grafton

[57] ABSTRACT

Improved apparatus for weighing and computing a value for articles. An integrated circuit microcomputer is supplied with the gross article weight from a scale and with price per unit weight data from a manual keyboard. Tare weight data may be entered either through the manual keyboard or automatically from the scale. The microcomputer computes a net weight and a value for each weighed article. The net weight, the price per unit weight and the value are indicated on a digital display and may be printed on a label. Filtering circuitry prevents jitter in the article weight supplied from the scale to the microcomputer and the display caused by small vibrations in the article or the scale.

6 Claims, 17 Drawing Figures

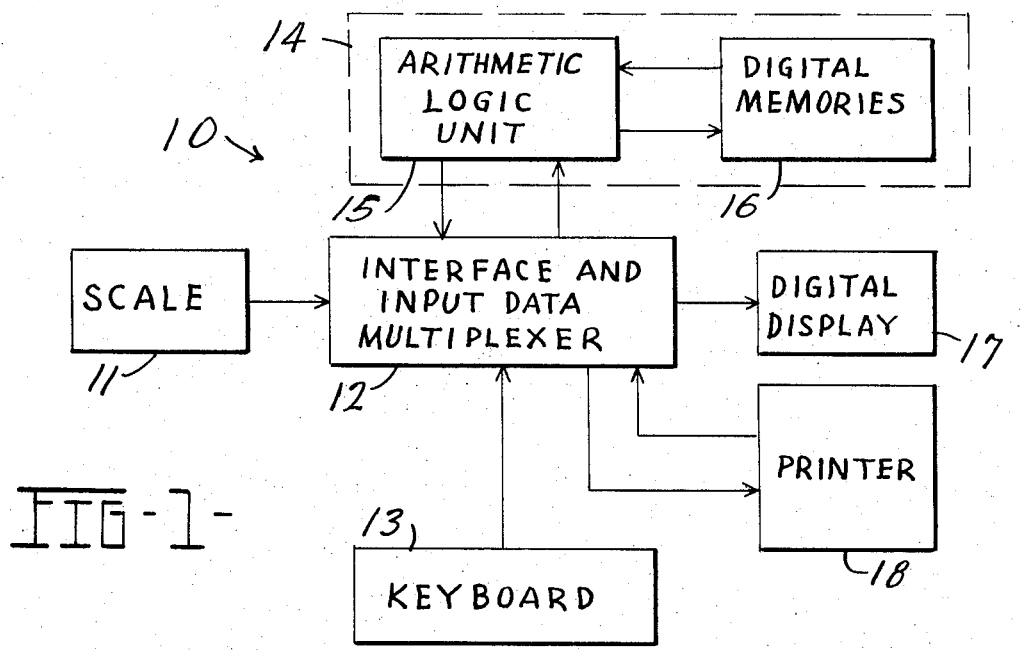
FIG-1-
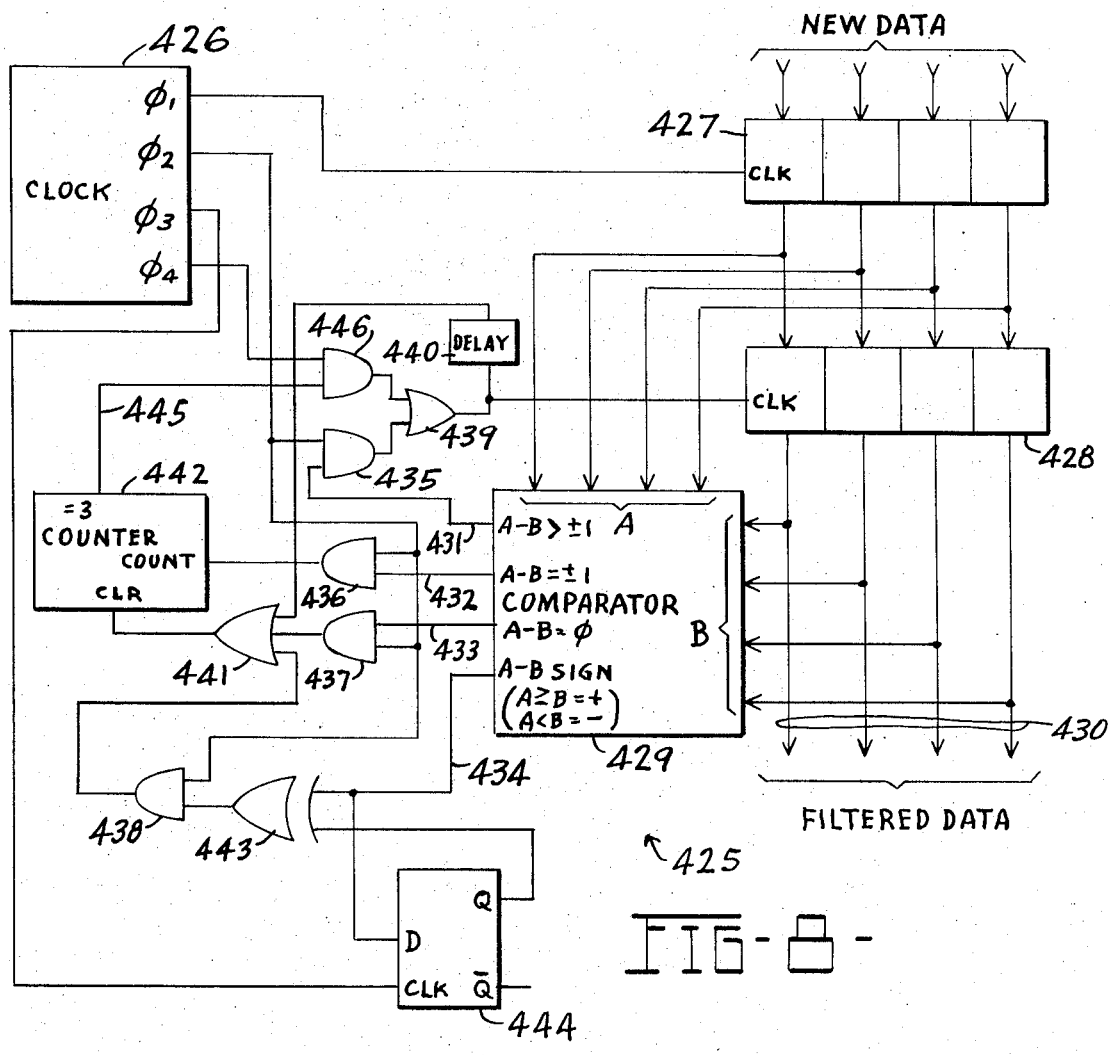
FIG-8-

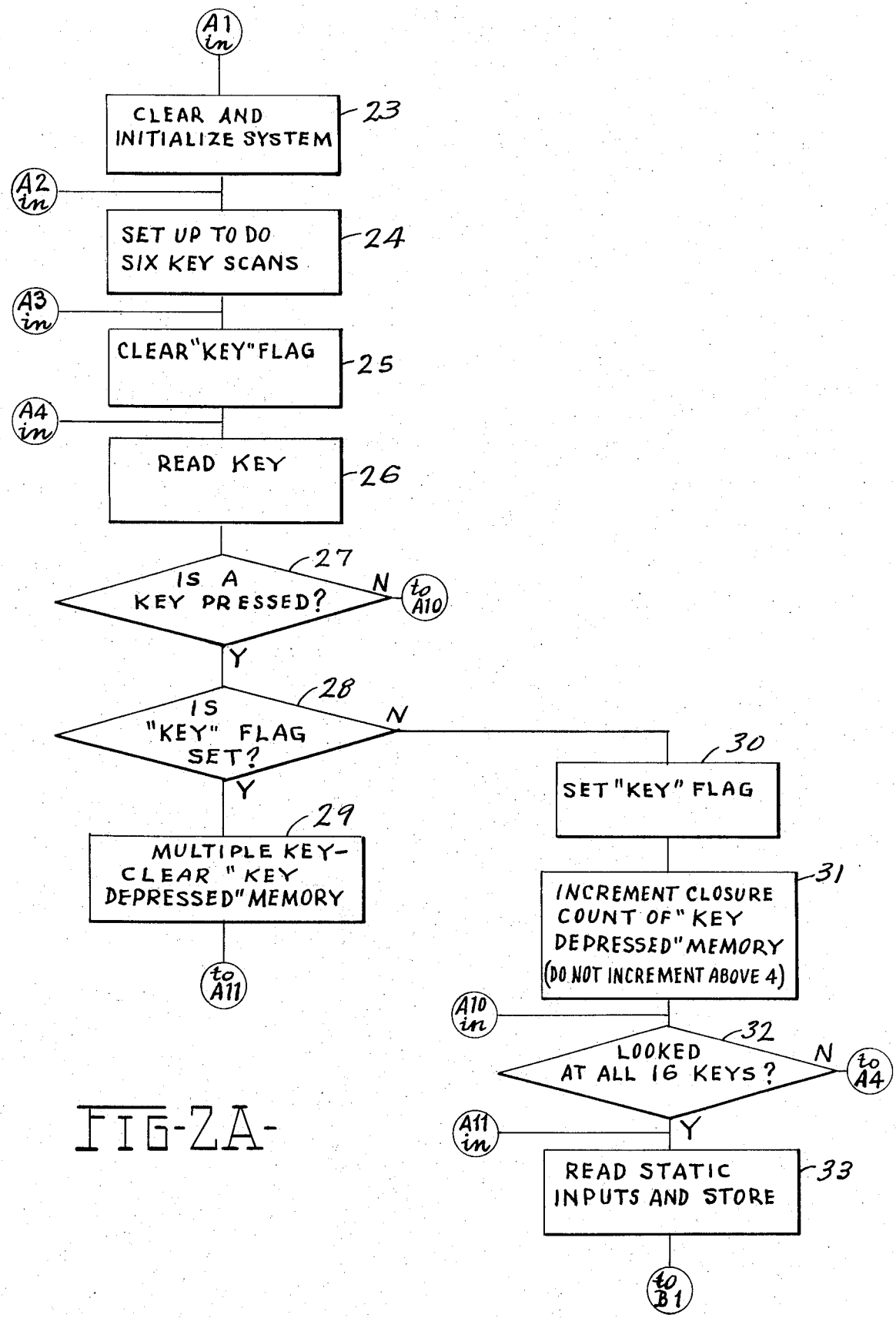
FIG-2A-

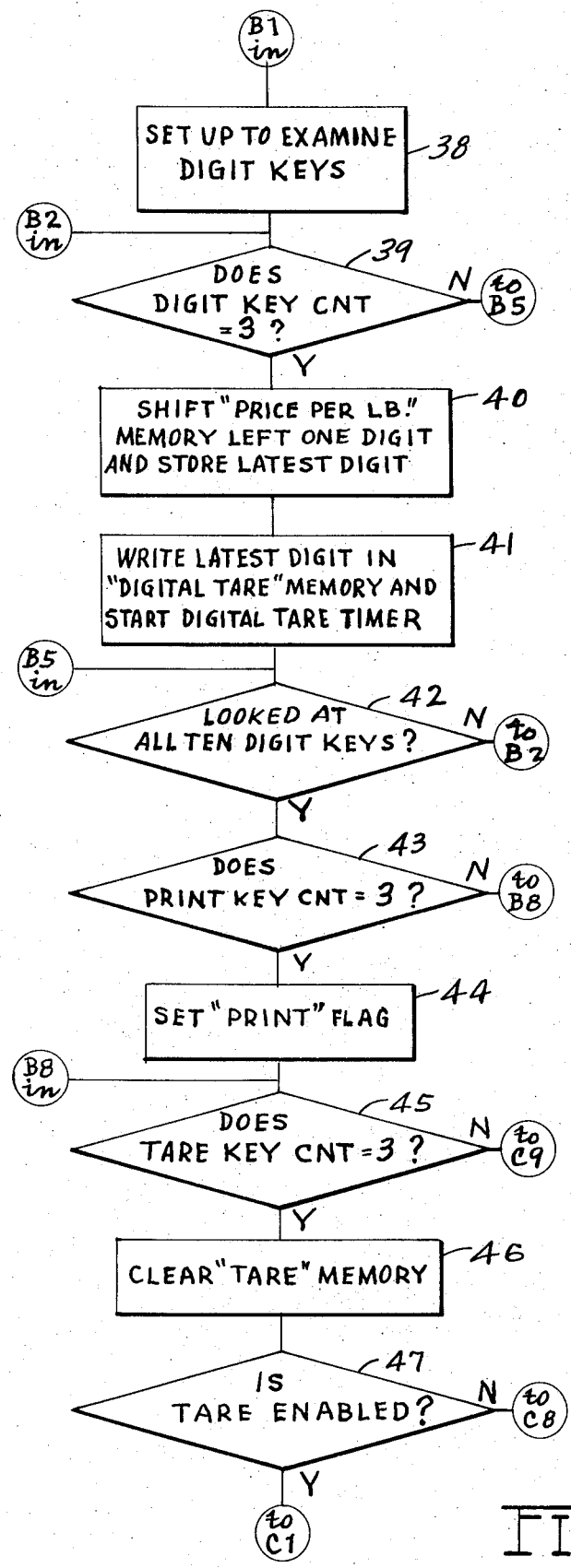
FIG-2B-

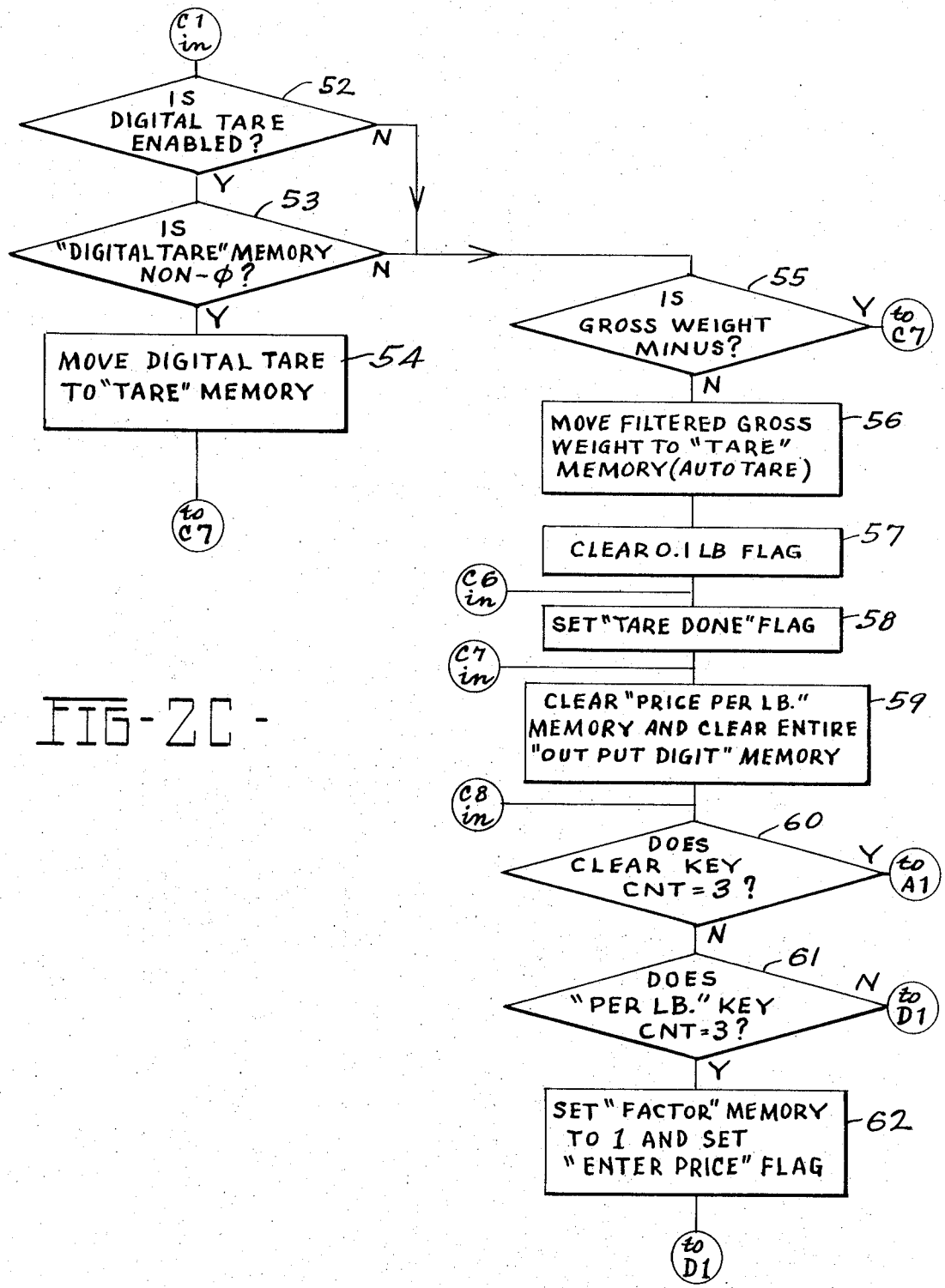
FIG-2C-

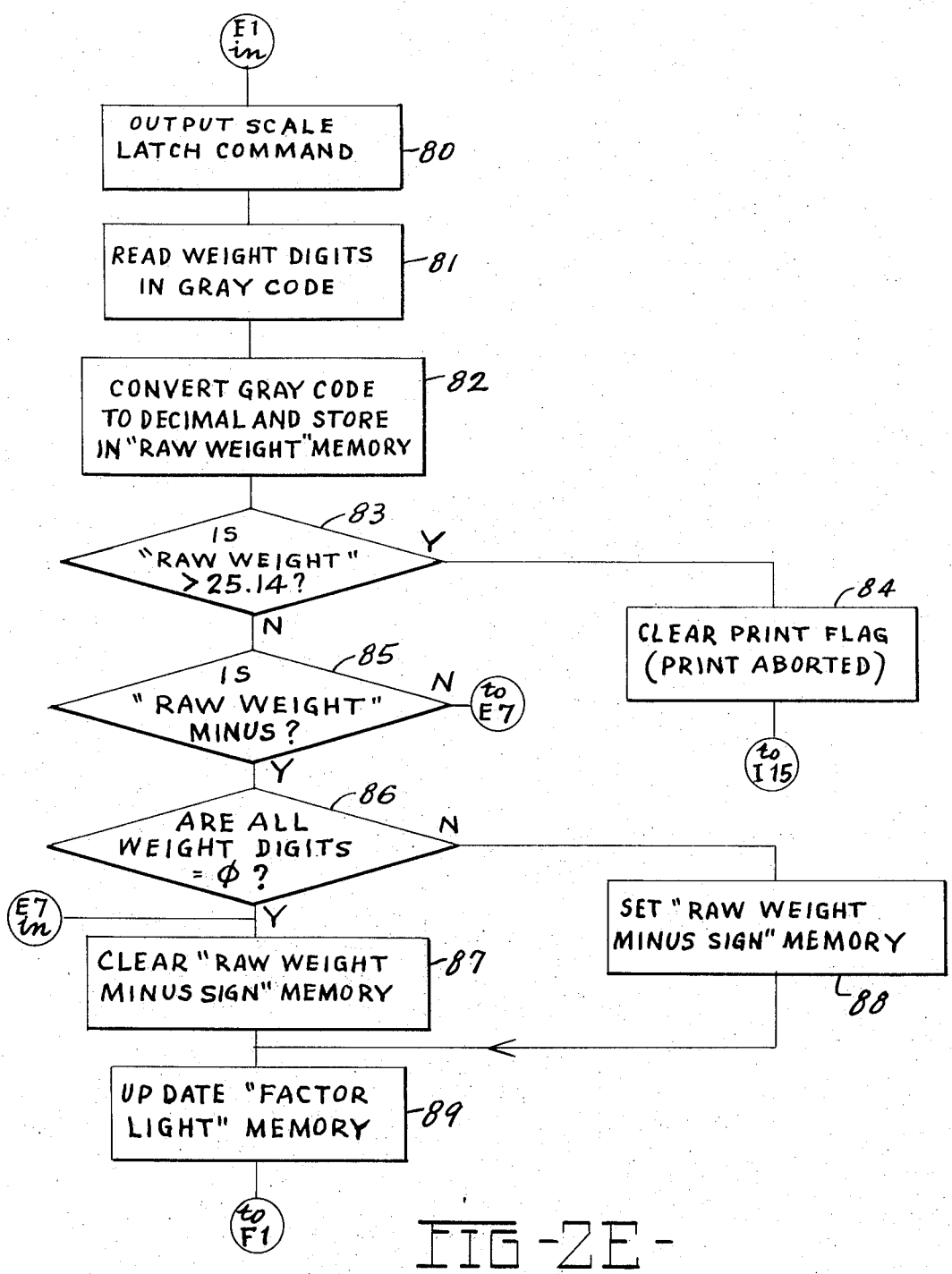
FIG-2E-

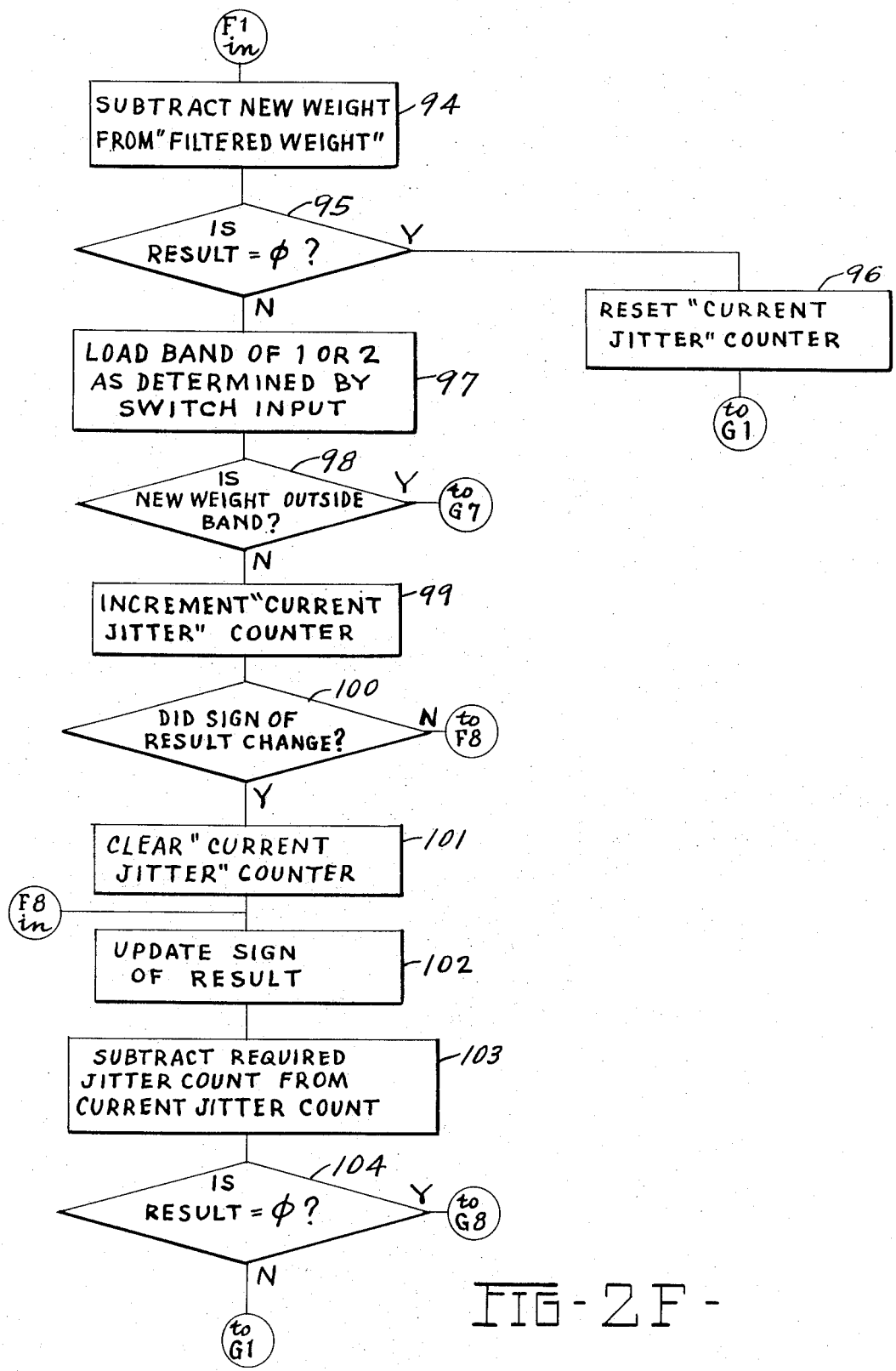
FIG-2F-

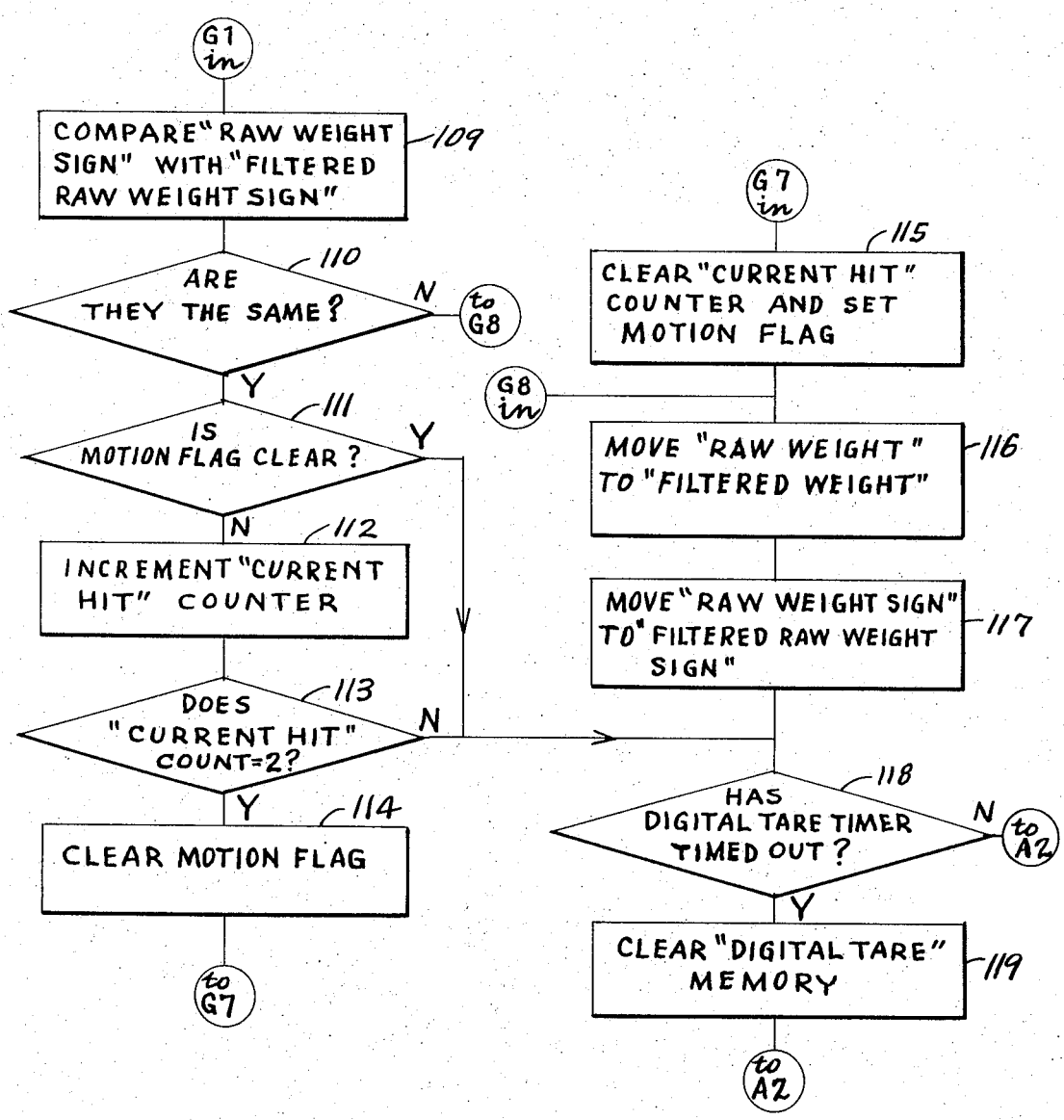
FIG-2G-

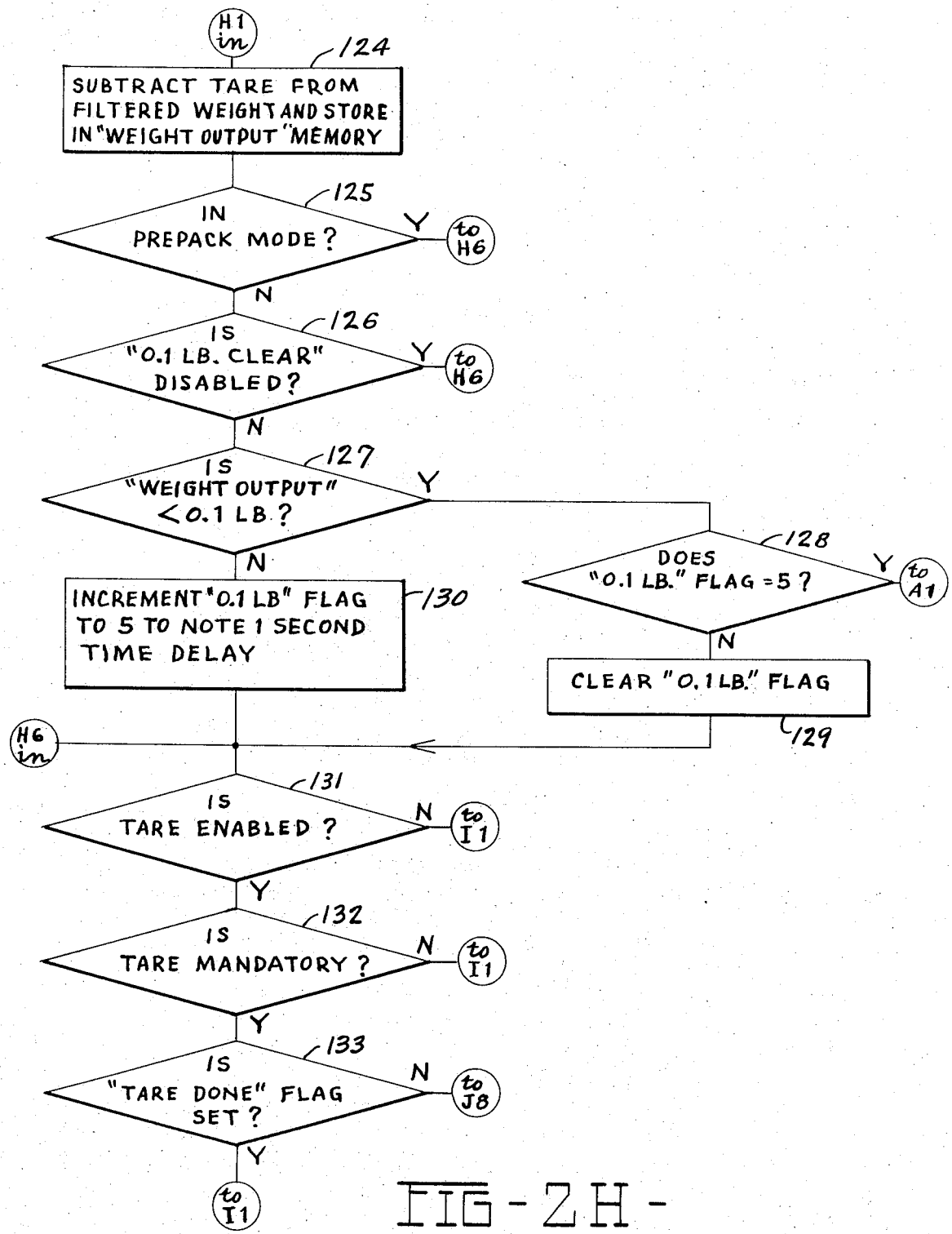
FIG-2H-

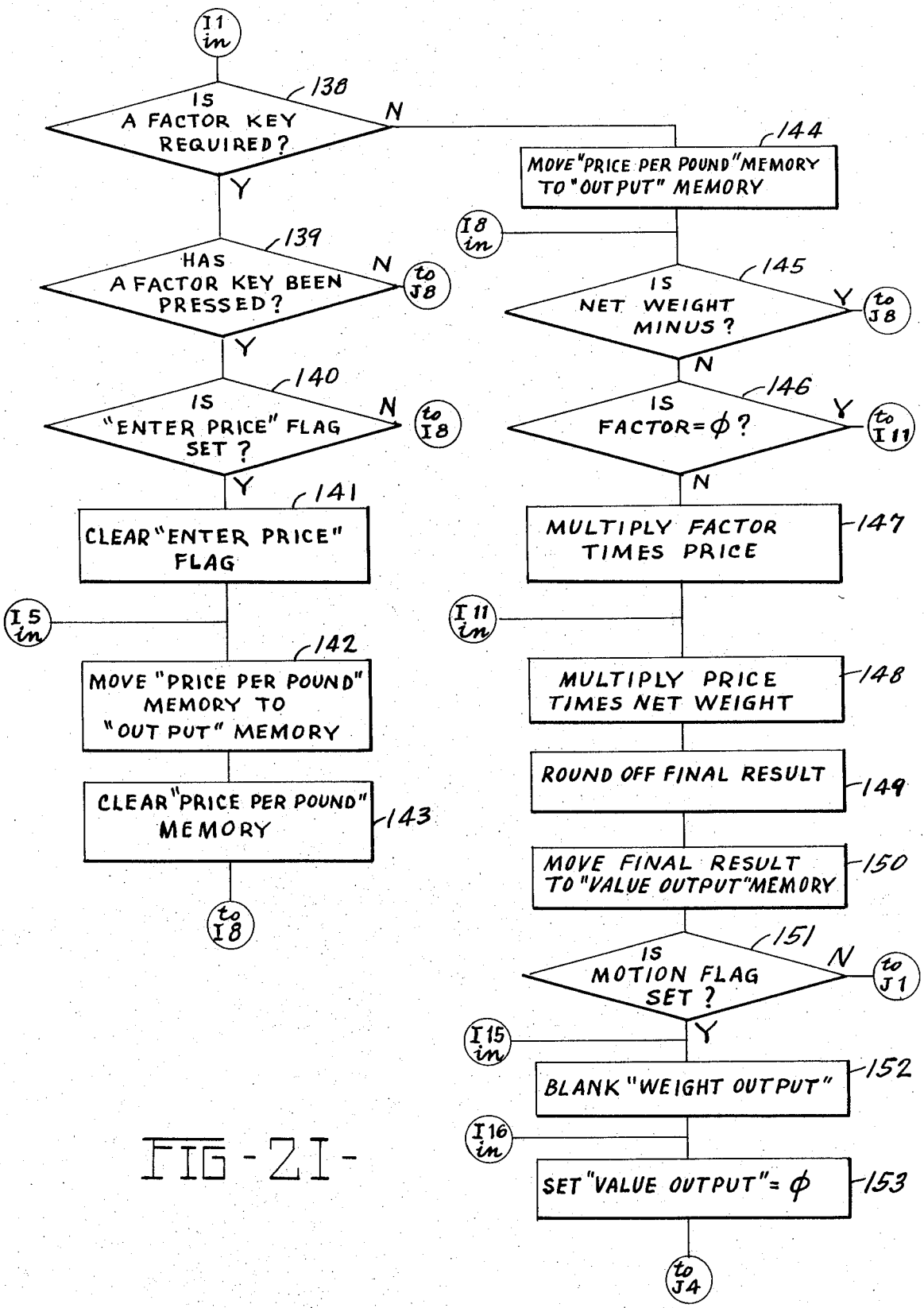
FIG-21-

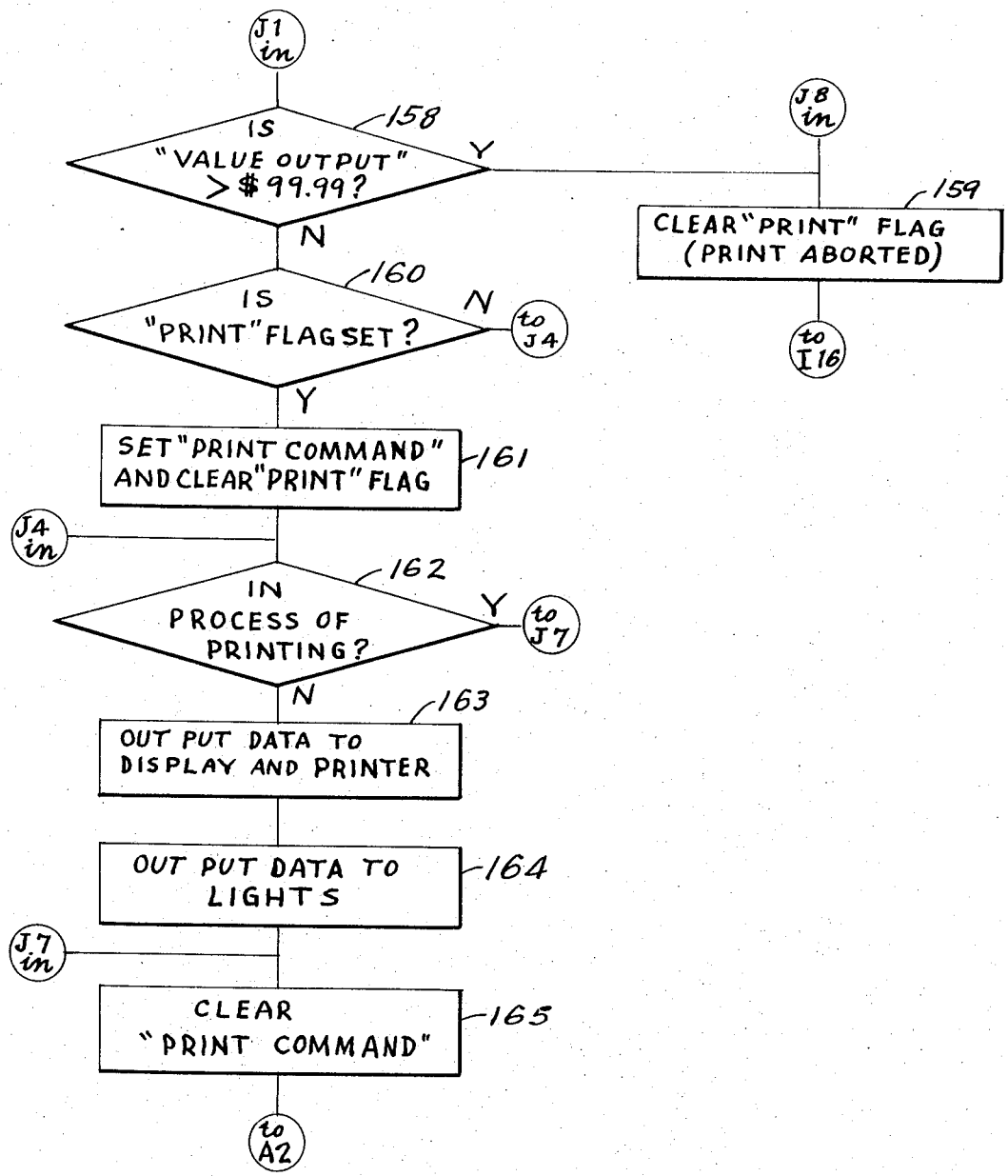
FIG-2J-

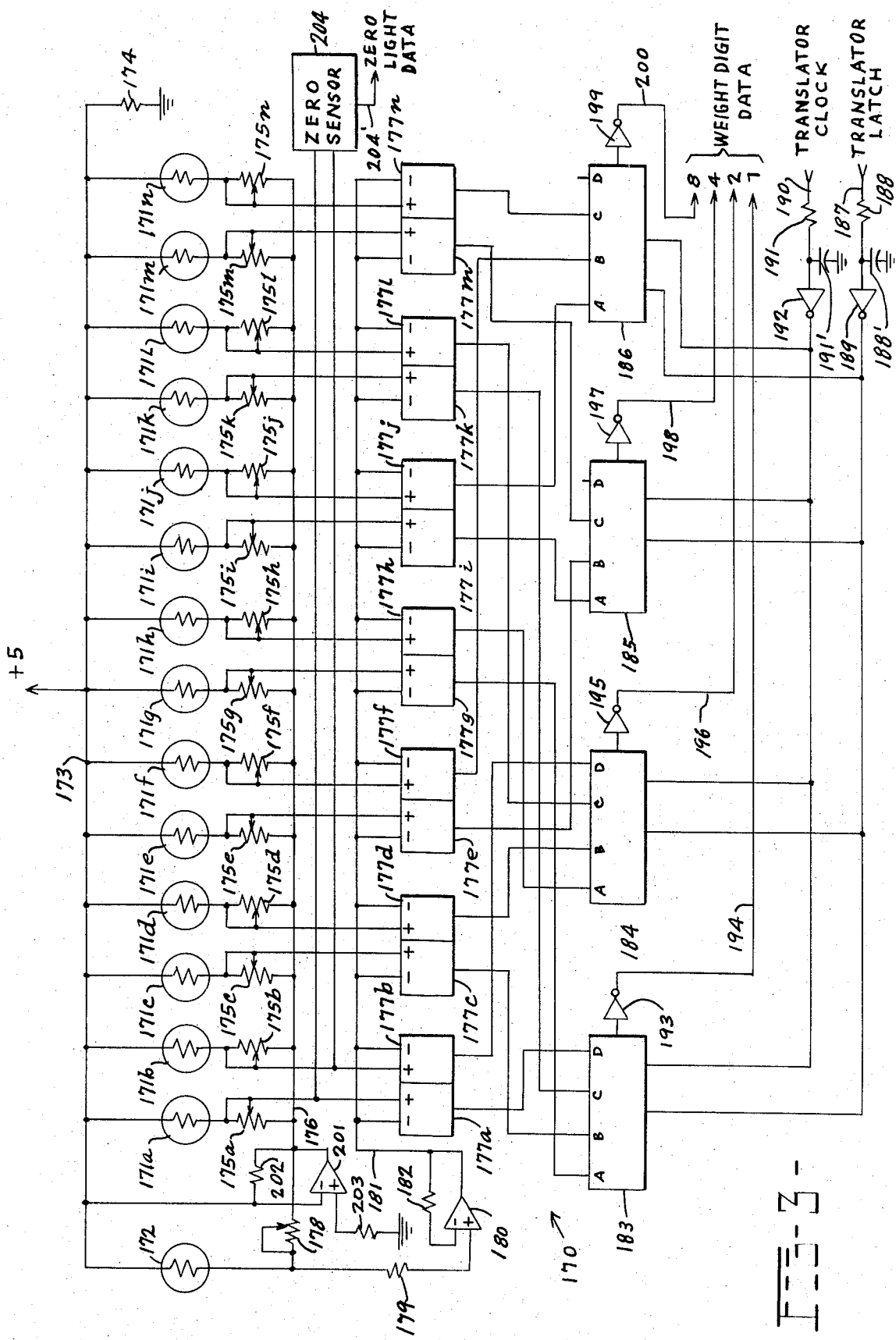

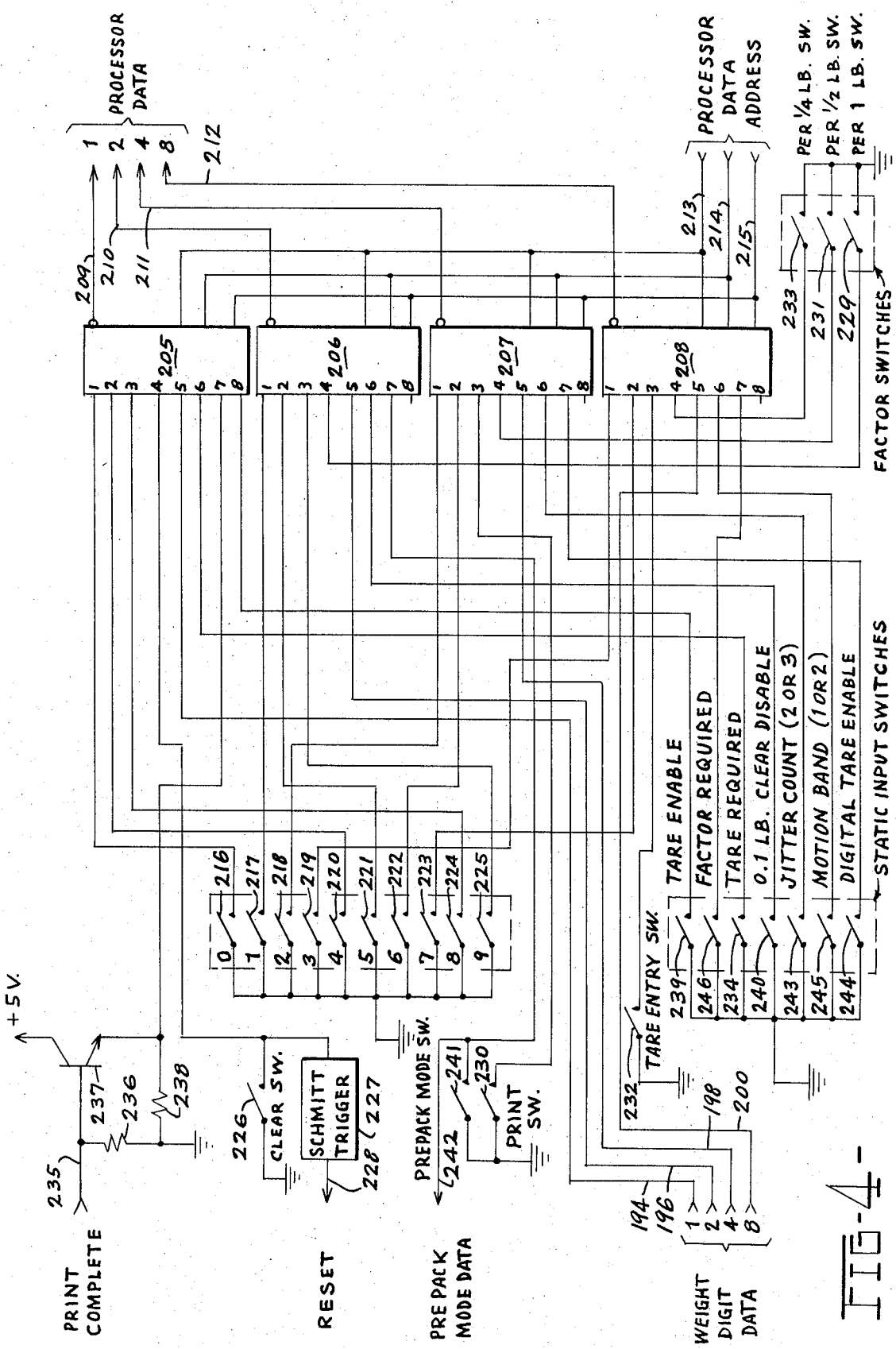

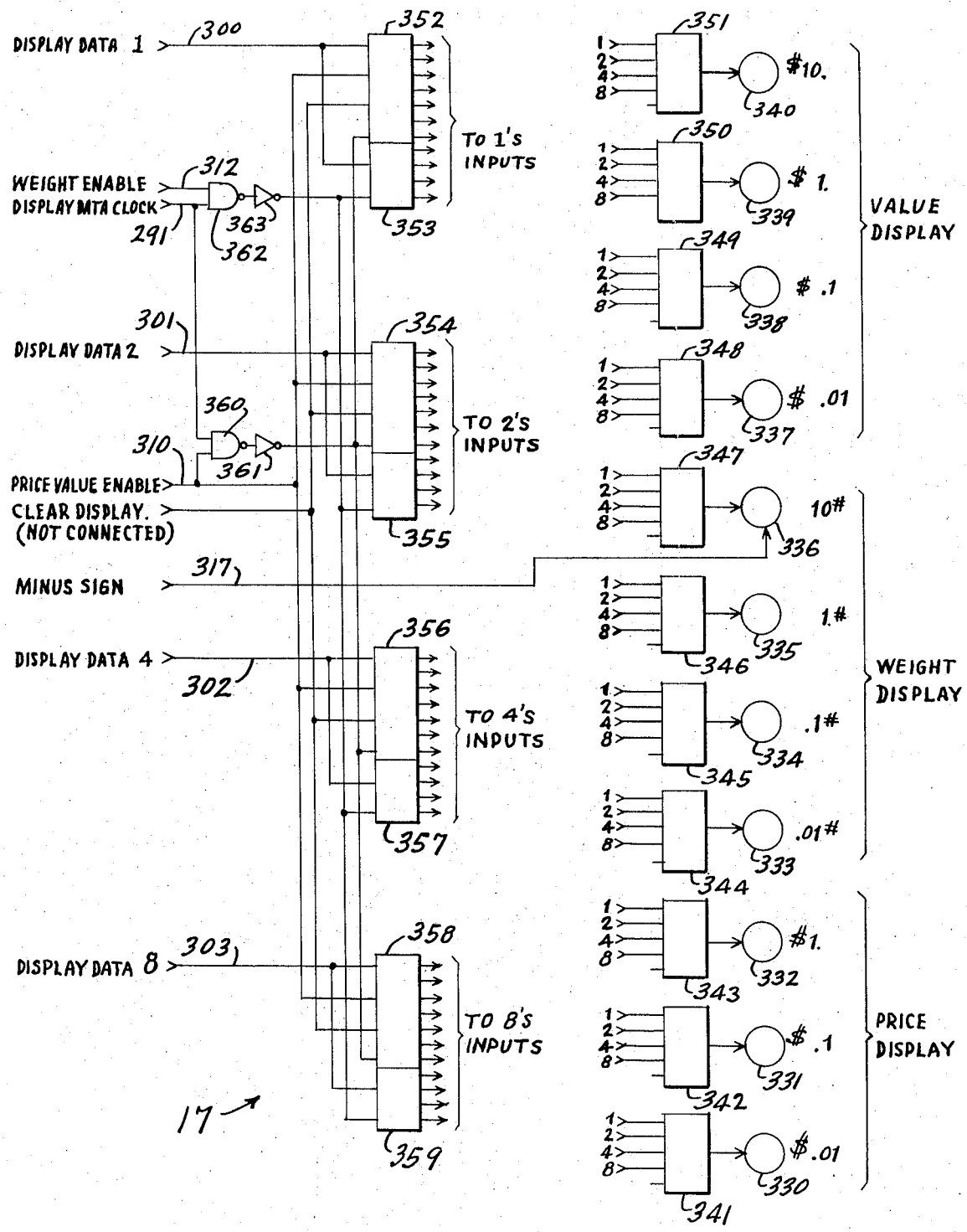
FIG-6-

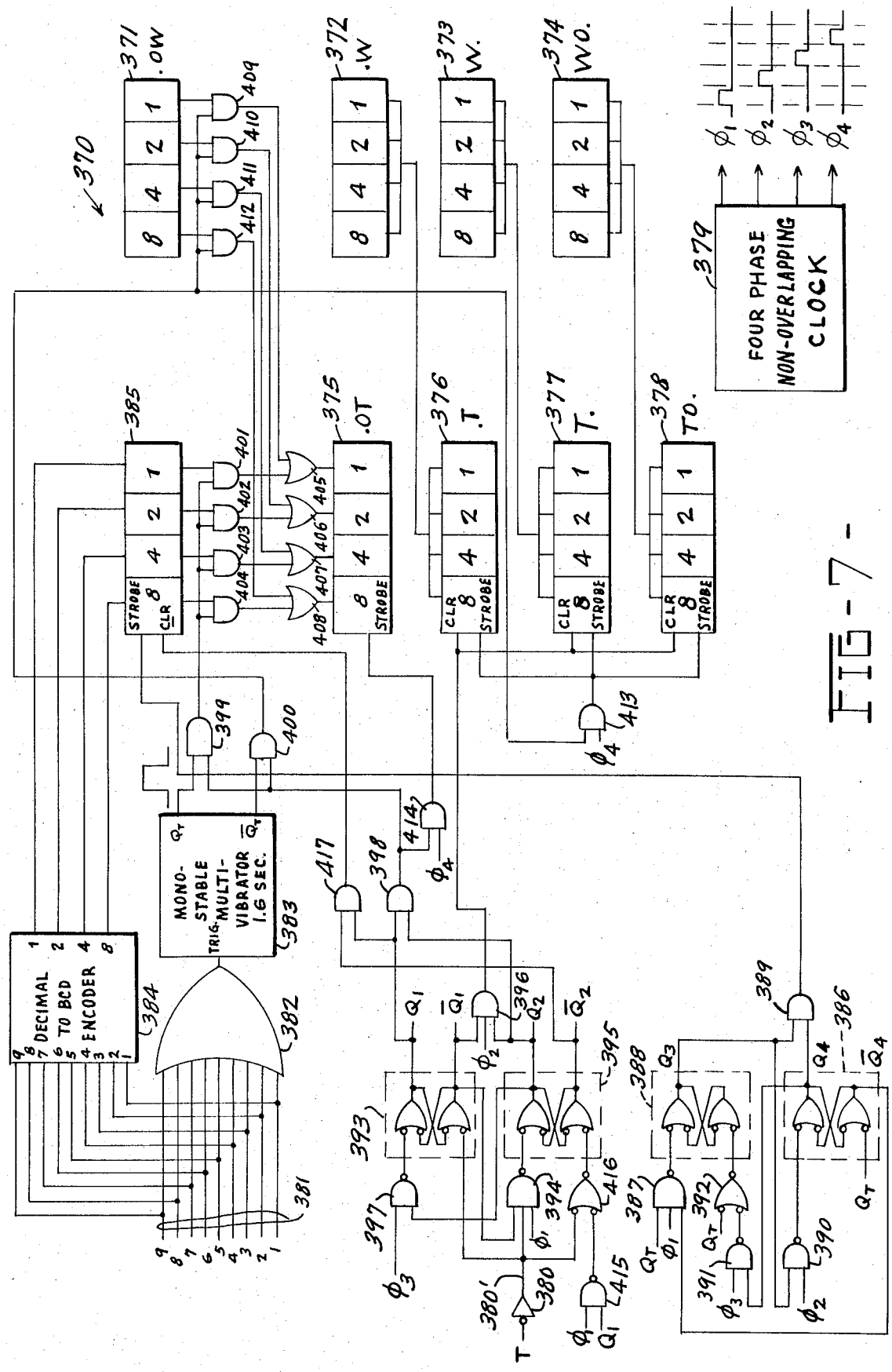

TARE ENTRY CIRCUITRY FOR A COMPUTING SCALE

BACKGROUND OF THE INVENTION

This invention relates to computing scales and more particularly to an improved computing scale which weighs an article and computes desired data from the article weight such as an article value based upon the article weight and a predetermined price per unit weight.

Computing scales are used in many industries for weighing articles and computing desired data from the article weight. Computing scales are, for example, commonly used in the retail food sales industry for weighing meats, produce and similar articles sold by weight and for computing from the article weight the value of such article based upon a predetermined price per unit weight. The article weight and the computed value are then displayed to the store clerk and to customers and, in some cases, are also automatically printed on an article label.

Computing scales are also used for obtaining data other than the value of articles. Such scales, for example, are sometimes used for obtaining a count of the number of pieces in a container. The scales weigh the number of pieces in the container and divide the measured weight by an average weight per piece for obtaining a piece count. Or, computing scales may be used for obtaining a net weight of a material having a known percentage, by weight, of impurities. For example, if it is known that a particular material has a moisture content of 2% by weight, it may be desired to multiply the measured gross weight from a scale by 98% so that the net or dry weight of the material is indicated.

Computing scales have become very sophisticated and highly accurate with the development of digital computing techniques. Advance computing scales convert a measured gross article weight into a digital format, subsequently convert the digitized gross weight into a digital net weight, and multiply the net weight by a price per unit weight or some other factor in a digital computer. The result appearing at the computer output may then be displayed on a digital readout, such as on Nixie tube readouts or on seven-segment readout devices. In some instances, a record is also printed of the computer output. The record may, for example, consist of a label for application to the article being weighed.

The use of digital techniques and the greatly increased accuracy of modern digital computing scales has accentuated some problems which were generally of little concern in the relatively slow and less accurate prior art analog computing scales. One such problem area is jitter in the measure weight. As used herein, weight "jitter" refers to very small fluctuations or oscillations in the measured weight generally caused by small vibrations of either the article being weighed or the scale. Digital computing scales used for retail sales typically indicate weight to 1/100th of a pound. At this accuracy, a relatively small vibration may cause the indicated digital weight to jitter between two or more values. This problem is accentuated when an article has a weight between two values. If, for example, an article weighs 9.135 pounds and the scale indicates only to 1/100th of a pound, the displayed weight will tend to jitter or alternate between 9.13 pounds and 9.14 pounds. This in turn may cause data computed from the article weight to jitter between two values.

Computing scales are generally provided with means for supplying a tare weight to the computer for use in determining net weights. In many scales, a separate set of buttons or switches are used solely for tare weight entries. More sophisticated computing scales may measure the tare weight on the scale and automatically enter the measured tare weight when an "enter tare" switch is closed. These scales are often provided with a switch for selecting either an automatic mode or a manual mode for entering tare weights. However, the mode selecting switches and the manual tare entry keys are not always convenient and there is a possibility of entering an erroneous tare weight. Furthermore, when the scale is designed to compute values, a separate set of keys or switches has generally been required for entering price per unit weight data. This results in an unnecessary duplication of switches or keys for entering data into the computer.

SUMMARY OF THE INVENTION

According to the present invention, apparatus for weighing and digitally computing a value for articles is provided with improved circuitry for filtering weight signals to eliminate the effects of jitter and with improved circuitry for entering digital tare weight data in either manual or automatic operating modes. A digital scale is connected through an interface to provide gross weight data to an integrated circuit microcomputer. A digital keyboard is also connected to the interface for supplying both price per unit weight data and tare weight data to the microcomputer. The keyboard also includes a "tare entry" key. The apparatus is designed such that if the tare entry key is pushed within a predetermined time interval after a digit key has been pushed, the microcomputer recognizes the digit only as a tare weight digit. If the tare entry key is not pushed within the time interval, the digit is recognized only as a price per unit weight digit. Thus, the entered digit is no longer recognized as a tare digit but remains stored as a price per unit weight digit. If the tare entry key is pushed when a digit key had not been pushed within the preceding predetermined time interval, the current weight on the scale is entered into the microcomputer as the tare weight. The microcomputer computes a net weight for an article placed on the scale from the measured gross weight and the tare weight and subsequently computes a value from the net weight and the price per unit weight. The net weight, the price per unit weight and the value are then supplied to a digital display and, optionally, to a label printer.

The keyboard also may be used for entering fractional price data. For example, the entered price may be "per ½ pound" or "per ¼ pound." When fractional prices are entered, the microcomputer normalizes the price data to a price per unit weight prior to computing a value. The price data is normalized by multiplying the entered fractional price by a factor. If an entered price is, for example, "per ¼ pound," it is multiplied by a factor of four to obtain a price per pound.

The digital weight data from the scale is filtered to eliminate jitter or any ambiguity between adjacent digital increments. The measured gross weight is periodically compared with a filtered weight which is used by the microcomputer for computing the net weight and the article value. If the compared weights differ by more than a predetermined amount, a motion signal is generated and the filtered weight is revised to the value of the measured gross weight. If they differ by less than the predetermined amount, a counter is incremented. The counter is cleared whenever the two weights are equal or the filtered weight is revised. The filtered weight is also revised when the counter reaches a predetermined count. Thus, if jitter causes the measured gross weight to alternate between two adjacent values, e.g., 9.13 pounds and 9.14 pounds, and the filtered weight is one of these values, e.g., 9.13 pounds, then the counter will never be incremented to the predetermined count. The displayed weight and the weight used for computing a value will then remain constant. The motion signal, which may be used to blank the weight display and/or to inhibit a printer, is extinguished when the filtered weight and the measured gross weight are equal for a predetermined number of successive comparisons.

Accordingly, it is a preferred object of the invention to provide improved apparatus for weighing and computing a value for articles.

Another object of the invention is to provide improved circuitry for filtering weight data from a digital scale to prevent jitter and ambiguities between adjacent weight increments.

Still another object of the invention is to provide improved circuitry for manually or automatically entering tare weight data into a scale system.

Other objects and advantages of the invention will become apparent from the following detailed description, with reference being made to the accompanying drawings.

BRIEF DESCRIPTION OF THE DRAWINGS

FIG. 1 is a block diagram of apparatus for weighing and computing a value for articles embodying the principles of the present invention;

FIG. 3 is a detailed schematic logic circuit diagram of one embodiment of the translator portion of a scale for use in apparatus for weighing and computing a value for articles according to the present invention;

FIG. 4 is a schematic logic circuit diagram of a keyboard and data input multiplexer for use in apparatus for weighing and computing a value for articles according to the present invention;

FIG. 6 is a detailed logic circuit diagram of a digital display for use in apparatus for weighing and computing a value for articles according to the present invention;

FIG. 7 is a logic circuit diagram of a modified embodiment of apparatus for manually or automatically entering tare weight data into a scale system in accordance with the present invention; and FIG. 8 is a logic circuit diagram of apparatus for filtering digital weight data according to the present invention to prevent ambiguities between adjacent weight increments.

DESCRIPTION OF THE PREFERRED EMBODIMENTS

Figure 2D:
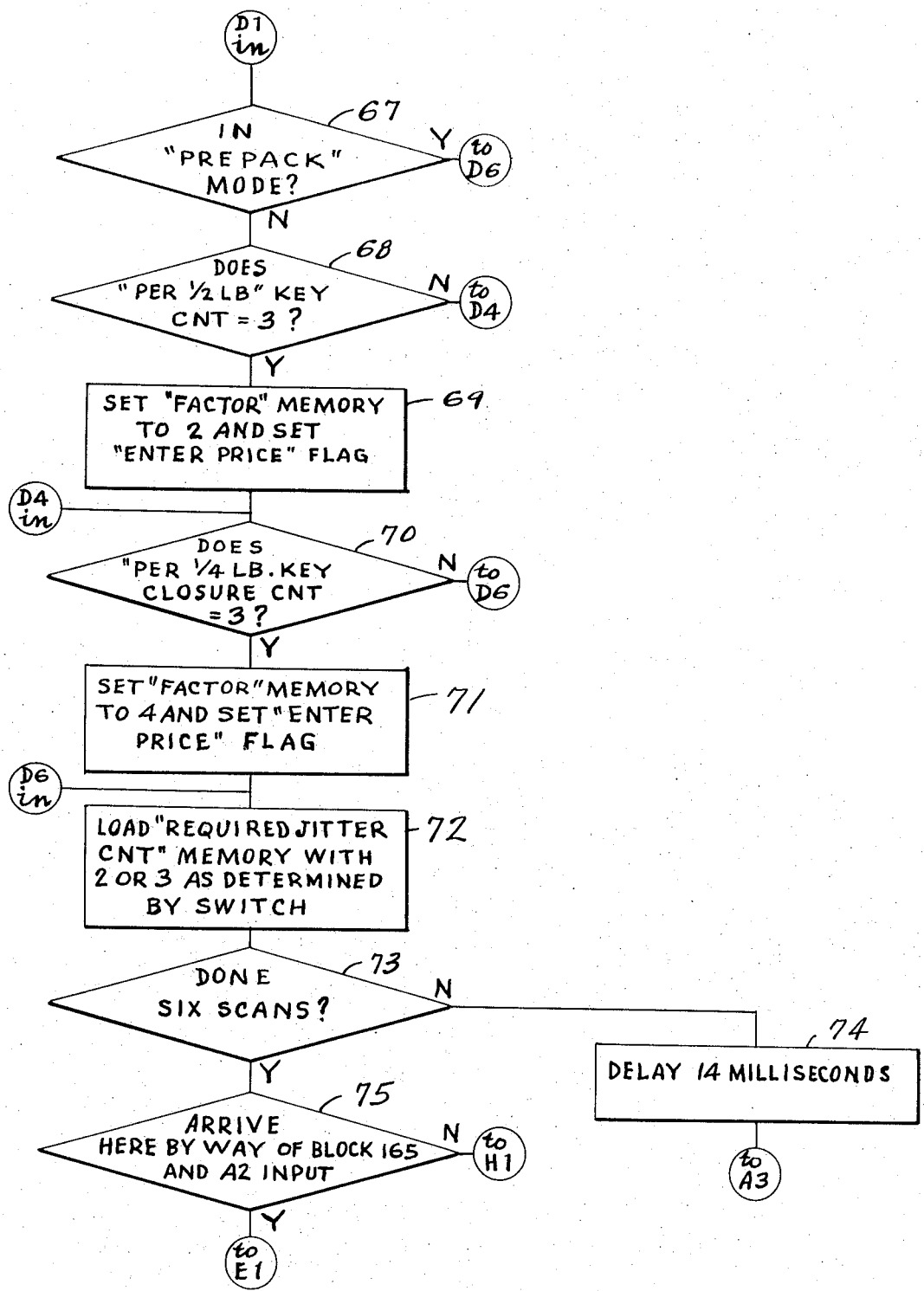
FIG. 2, which consists of FIGS. 2A through 2J, is a flow diagram showing the operation of apparatus for weighing and computing a value for articles according to the present invention.

Turning now to the drawings and particularly to FIG. 1, a block diagram is shown of apparatus 10 for weighing and computing a value for articles embodying the principles of the present invention. The apparatus 10 includes a scale 11 for supplying a weight signal in a digital format to interface and input data multiplexer circuitry 12. Data is also applied from a keyboard 13 to the interface and multiplexer 12. From the interface and multiplexer 12, the scale and keyboard data passes to a data processor 14 which includes an arithmetic logic unit 15 and one or more digital memories 16. The scale 11 and the keyboard 13 supply gross weight data, tare weight data and price data to the data processor 14. The arithmetic logic unit 15 subtracts the tare weight from the measured gross weight for an article to obtain a net weight. If necessary, the price data is normalized and the net weight is subsequently multiplied by the price per unit weight for obtaining a value for the weighed article. The net weight data, the price data and the computed value are then passed through the interface 12 to a digital display 17 and also may be supplied to an optional printer 18 for use in printing a label for the weighed article.

The apparatus 10 is designed to provide a maximum degree of accuracy in the measured article weight and the computed value. The possibility of an erroneous data entry from the keyboard 13 caused, for example, by contact bounce, is minimized by repeatedly scanning the keyboard 13 at a relatively fast rate. Data is stored in the memory 16 only after the data is received from the keyboard 13 for a predetermined number of successive scans, such as three successive scans at a rate of one scan each 15 millisecond.

Data from the scale 11 is also filtered to minimize the effects of jitter or ambiguities between two adjacent weight increments caused by vibration of the scale or an article on the scale. The arithmetic logic unit 15 uses a filtered weight value stored in a portion of the memory 16 for computing the net weight and the article value. The digital output applied from the scale 11 to the interface and multiplexer 12 is periodically scanned and compared with the stored filtered weight. If the two weights differ by more than a predetermined amount, a motion signal is generated and the filtered weight is revised to the value of the measured gross weight from the scale 11. If they differ by less than the predetermined amount, a counter within the arithmetic logic unit 15 is incremented. The counter is cleared whenever the two weights are equal or the filtered weight is revised. The filtered weight is also revised to the measured gross weight when the counter reaches a predetermined count, such as two or three. The motion signal, which may be used to blank the weight shown on the digital display 17, to inhibit a value computation, and to prevent the printing of a label by the printer 18, is extinguished when the filtered weight and the measured gross weight are equal for a predetermined number of successive comparisons. Thus, if the output from the scale 11 alternates on successive cycles between two numbers such as 9.13 pounds and 9.14 pounds and the filtered weight stored in the memory 16 is 9.13 pounds, the counter will be alternately incremented and cleared as the weight jitters between the two values. Since the counter is not incremented up to the predetermined count, the filtered weight remains constant at 9.13 pounds and ambiguities in the weight supplied to the arithmetic logic unit 15, to the digital display 17 and to the printer 18 are eliminated.

The tare weight may be supplied to the data processor 14 either in an automatic mode from the scale 11 or in a manual mode from the keyboard 13. The keyboard 13 includes a "tare entry" key which must be actuated each time a tare weight is entered into the data processor 14. The keyboard 13 also includes a set of 10 digit keys for supplying data through the interface and multiplexer 12 to the data processor 14. When a digit key on the keyboard 13 is pushed, the digit is stored in both a price portion of the memory 16 and in a temporary tare weight portion of the memory 16. At the same time, a timer is started for measuring a predetermined time interval which is generally on the order of 1 to 2 seconds. If the tare entry key is then pushed before the measured time interval has elapsed, the price memory is cleared and the number stored in the temporary tare memory is shifted into a second tare weight memory for use by the arithmetic logic unit 15 in computing a net weight. The display 17 will then show the manually entered tare weight as a negative value until an article is placed on the scale 11. If the tare entry key is not pushed, the temporary tare memory will be cleared when the timer shuts off after measuring the predetermined time interval and the entered number will be used only as a price digit. If, on the other hand, the tare entry key is pushed and the timer is not currently on, the digital output from the scale 11 will be stored in the tare weight memory for use in computing a net weight. Since the gross weight and the entered tare weight are now equal, the net weight shown on the display 17 will be zero. A container or package placed on the scale 11 for obtaining the tare weight may then be filled with one or more articles for which a value is to be computed.

The keyboard 13 may also include additional keys which are used for fractional pricing, for selecting a "prepack" mode of operation, for clearing all data entered into the memories 16 and for activating the printer 18. In the fractional pricing mode of operation, entered price data will be considered by the data processor 14 as a price per fractional unit weight such as $1.19 per ½ pound or $1.19 per ¼ pound. If the price is "per ½ pound", the arithmetic logic unit 15 multiplies the entered $1.19 by two and uses the resulting $2.38 per pound for computing a value. Similarly, if the price is "per ¼ pound," the arithmetic logic unit 15 multiplies by a factor of four. During normal operation of the apparatus 10 in, for example, a delicatessen, it may be desirable to clear the digital memory 16 each time an article is removed from the scale 11. Thus, a new tare weight data and price data must be entered for each article for which a value is to be computed. During the normal mode of operation, the price and tare memories are cleared each time the weight output from the scale 11 goes above a predetermined weight for a predetermined time and then falls below the predetermined weight. However, at times it may be desirable to use the apparatus 10 for preparing labels for a series of identical articles, such as packages of swiss cheese, all of which have the same price per unit weight and the same tare weight. A "prepack" key is provided on the keyboard 13 for selecting the operating mode of the apparatus 10. When the apparatus 10 is in the "prepack" mode of operation, the memories 16 will not be cleared when an article is removed from the scale 11. Thus, the entered tare weight data and price data are maintained from article to article. In addition, government regulations commonly prohibit the use of fractional pricing for articles which are prepackaged and labeled. Therefore, when the apparatus 10 is in the "prepack" mode of operation, operation of the fractional pricing keys on the keyboard 13 is inhibited.

Prior to considering the detailed circuitry for the apparatus 10 for successively weighing and computing the value of a plurality of articles, attention is directed to FIGS. 2A through 2J which show a flow diagram for a preferred operating sequence of the apparatus 10. The flow diagram consists of a series of blocks in the shape of diamonds or rhombuses and rectangles. Each diamond corresponds to a question having either a yes or no answer which may be asked by conventional logic circuitry in the microcomputer 14. Each rectangular block corresponds to the performance of a specific function such as storing a value in a memory or causing a label to be printed. In reading the flow diagram, entry is made to the top or left of a block and the logic flows downwardly and to the right. The numbers placed in the circles to the top and left of the blocks represent input locations. For example, the "A2 in" in a circle on the left of the flow diagram in FIG. 2A represents an input to the second block from the top in sheet A of FIG. 2. The numbers in the circles to the right of or below the blocks in the flow diagram represent an output connected to a different location in the flow diagram. For example, the circle below the block 33 at the lower right of FIG. 2A is designated "to B1." This indicates that a jump is made from this block to the input to the first block in sheet B of FIG. 2.

Referring now to FIG. 2A, the flow diagram is initially entered through an A1 input to a block 23 at which the apparatus 10 is cleared and initialized in preparation for weighing and computing a value for an article. The block 23 and an A2 input are connected to a block 24 at which the data processor 14 prepares to do six scans of the keyboard 13. The block 24 and an A3 input are connected to a block 25 in which a "key" flag is cleared. As used herein in discussing the flow chart of FIGS. 2A through 2J, a flag indicates a latch, a flip-flop or a bit stored in a memory to indicate the occurrence or nonoccurrence of a condition. The "key" flag, for example, indicates that a key on the keyboard 13 has been depressed. The block 25 and an A4 input are connected to a block 26 in which the keyboard 13 is scanned to read any depressed key. From the block 26, a check is made to see if a key is actually depressed during a scan at a block 27. If not, a jump is made to an A10 input, while if a key is depressed a check is made to see if the key flag is set at a block 28. If the key flag is already set, it indicates that multiple keys on the keyboard 13 are simultaneously depressed and a "key depress" memory is cleared at a block 29 and the logic jumps to an A11 input. If a key was depressed and the key flag was not set, the block 28 is connected to a block 30 at which the key flag is set. After the key flag is set, the "key depress" memory is incremented at a block 31.

According to the following described embodiment of the apparatus 10, a key must be recognized as being depressed for three successive scans before data is entered into the memory 16. The "key depress" memory indicates the number of successive times a key has been recognized. From the block 31, a check is made at a block 32 to see if all 16 keys on the keyboard 13 have been looked at. If not, the logic returns to the A4 input while if they have all been looked at, the block 32 and an All input are connected to a block 33 wherein static inputs are read and data from such static inputs is stored in the memory 16. The static inputs consist of a plurality of internal switches within the apparatus 10 which permit selecting various optional operating modes and interlocks. Once these switches are set for a particular installation, they are normally not changed unless the operating requirements for the apparatus 10 change. The static inputs may include, for example, a "tare enable" switch, a "tare required" switch, a "factor required" switch, a switch which determines if the apparatus 10 is to be cleared whenever a package or article is removed from the scale 11 and the weight drops below 0.1 pound, a switch which establishes the jitter count required to change weight data in the memory 16, a switch which determines the bandwidth for the motion detector and a switch which enables or disables the manual entry of tare weights through the keyboard 13. After the static inputs are read at the block 33, the logic jumps to the B1 input.

Turning to FIG. 2B, the B1 input is connected to a block 38 at which the apparatus 10 is set up to examine the ten digit keys on the keyboard 13. The output from the block 38 and the B2 input are connected to a block 39 at which a check is made to see if the digit key depressed count equals three. If not, the logic jumps to a B5 input. If the count does equal three, it indicates that the digit key is actually pressed and the contents of a "price per pound" memory are shifted left one digit and the latest digit from the keyboard 13 is stored in the least significant digit location at a block 40. If a key is not pushed for a count of three, it is assumed that noise is present and that the key was not pushed. In a similar manner, the contents of a "digital tare" memory are then shifted left one digit and the same digit is stored in the least significant digit location at a block 41. At the same time, a digital tare timer is started. The digital tare timer measures a predetermined time interval generally within the range of 1 to 5 seconds and, for example, may measure 1.6 seconds. If a manual tare entry is to be made through the keyboard 13, the predetermined time interval must be sufficiently long to allow an operator to press a "tare entry" key after a digit key is pushed. It has been found that 1.6 seconds is generally adequate.

The output of the block 41 and the B5 input are connected to a block 42 at which a check is made to see if all 10 digit keys have been looked at. If not, the logic returns to the B2 input while if they have, the logic moves to a block 43 in which a check is made to see if a "print" key has been pushed for a count of three. If the print key has not been pushed for a count of three, the logic jumps to a B8 input, while if it has, a block 44 sets a "print" flag. The block 44 and the B8 input are connected to a block 45 at which a check is made to see if the "tare entry" key has been pushed for a count of three. If the tare entry key has not been pushed for a count of three, the logic jumps to a C9 input while if it has been pushed for a count of three, a "tare" memory which supplies the tare weight to the arithmetic logic unit 15 in the data processor 14 is cleared at a block 46. From the block 46, a check is made at a block 47 to see if one of the static or internal switches is set to enable the entry of a tare weight. If the switch is not set, then the gross weight from the scale 11 will always be used for computing values and the logic jumps to a C8 input, while if the entry of a tare weight is enabled, the logic jumps to a C1 input.

Referring now to FIG. 2C, the C1 input is applied to a block 52 at which a check is made to see if one of the static or internal switches is set to enable entry of a digital tare weight through the keyboard 13. If so, then a check is made to see if the "digital tare" memory is non-zero at a block 53. The "digital tare" memory is the temporary memory which stores digits manually entered through the keyboard 13. If a tare weight has been entered through the keyboard 13, causing the "digital tare" memory to be non-zero, the contents of the "digital tare" memory are moved at a block 54 to the "tare" memory which supplies data to the arithmetic logic unit 15 and the logic then jumps to a C7 input. If either the static switch is not set to enable a manual tare entry or the digital tare memory is zero, the blocks 52 and 53 are connected to a block 55 at which a check is made to see if the gross weight appearing at the output of the scale 11 is negative. If the gross weight is negative or minus, the logic jumps to the C7 input. If the gross weight is not minus, the filtered gross weight is moved to the "tare" memory at a block 56. Thus, a tare weight is automatically entered from the scale 11 when a tare weight is not entered from the keyboard 13 into the "digital tare" memory.

After the filtered gross weight is moved to the tare memory, a "0.1 pound" flag which is normally set when the scale output drops below 0.1 pound is cleared at a block 57. The output of the block 57 and the C7 input are applied to a block 58 which sets a "tare done" flag or latch to indicate that a tare weight has been entered into the "tare" memory. The block 58 and the C8 input are connected to a block 59 at which the "price per pound" memory and the entire "output digit" memory which supplies data to the digital display 17 and the printer 18 are cleared. The output of the block 59 and the C9 input are connected to a block 60 at which a check is made to see if a "clear" key on the keyboard 13 has been depressed for a count of three. If so, the logic returns to the A1 input and the apparatus 10 is cleared and initialized for a new cycle. If the clear key has not been pressed for a count of three, a check is made at a block 61 to see if a "per pound" key on the keyboard 13 has been pushed for a count of three. If not, the logic jumps to a D1 input, while if it has been depressed for a count of three, a "factor" memory is set to one and an "enter price" flag is set at a block 62. The contents of the factor memory are multiplied times an entered price in the "price per pound" memory to obtain the actual price per pound when fractional pricing is used. Thus, when the "per pound" key is depressed and a one is stored in a factor memory, the result will equal the entered price. As will be shown in FIG. 2D, if the price is per ½ pound or per ¼ pound, a two or a four, respectively, is stored in the "factor" memory for multiplying times the entered price to obtain the actual price per pound. From the block 62, the logic moves to the D1 input.

The D1 input is connected to a block 67 in FIG. 2D. A check is made at the block 67 to see if the apparatus 10 is in a "prepack" mode of operation as is determined by the setting of a switch on the keyboard 13. If the apparatus 10 is set to the "prepack" mode, the logic jumps to a D6 input to prevent entry of a factor of two or four into the factor memory. If the apparatus 10 is not in the "prepack" mode, a check is made at a block 68 to see if a "per ½ pound" key on the keyboard 13 has been closed for a count of three. If not, the logic jumps to a D4 input while if it has, the "factor" memory is set at a block 69 to two and the "enter price" flag is set. The output of the block 69 and the D4 input are applied to a block 70 at which a check is made to see if a "per ¼ pound" key on the keyboard 13 has been closed for a count of three. If not, the logic jumps to the D6 input while if it has, the "factor" memory is set to four at a block 71 and the "enter price" flag is set. The output of the block 71 and the D6 input are connected to a block 72 at which one of the static switches is checked to determine the selected jitter count and such count is loaded into a "required jitter count" memory. Although the required jitter count may be of any value, it is preferably either two or three. Thus, if the jitter count is three, the filtered weight and a raw or gross weight from the scale 11 must differ by a predetermined small amount for three consecutive counts or scans. From the block 72, a check is made at a block 73 to see if six scans have been made of the keyboard 13. If not, a 14 millisecond delay is executed at a block 74 and the logic returns to the A3 input. If six scans have been executed, a check is made at a block 75 to see if this point in the logic has been arrived at by way of a block 165 in FIG. 2J and the A2 input in FIG. 2A. If not, the logic jumps to an H1 input, while if it has, the logic jumps to an E1 input.

The E1 input is connected to a block 80 in FIG. 2E at which a latch command is outputed to the scale 11, permitting weight data to be supplied from the scale 11 to the interface and input data multiplexer 12. After a latch command is applied to the scale 11, the weight digits are read from the scale 11 at a block 81. The scale 11 is preferably either of a mechanical spring type with an optical encoding chart or of an electronic load cell type including an analog-to-digital converter. In the mechanical spring type scale, the optical encoding chart typically provides weight data digitized in a Gray code format while an electronic load cell scale and analog-to-digital converter will provide weight data digitized in a binary coded decimal (BCD) format. For the following description, it will be assumed that the scale 11 is of the mechanical spring type with an optical Gray code encoding chart. Thus, the weight digits are read in the Gray code at the block 81. After the weight is read, the Gray code is converted to a BCD format and the weight digits are stored in a "raw weight" memory at a block 82.

For apparatus 10 used in a delicatessen, a Gray code chart reading up to 25.14 pounds is generally more than adequate. This requires 14 columns on the Gray code chart. For greater weight readings, additional columns are required on the chart. A check is now made at a block 83 to see if the raw weight has exceeded the capacity of the Gray code chart or, in this case, if the weight has exceeded 25.14 pounds. If so, a "print" flag is cleared at a block 84, if such flag has previously been set, to abort a printing operation and the logic proceeds to an I15 input. If the weight capacity of the scale 11 has not been exceeded, a check is made at a block 85 to see if the contents of the "raw weight" memory are minus. If not, the logic jumps to an E7 input, while if the contents are minus, a check is made at a block 86 to see if all weight digits in the "raw weight" memory are equal to zero. If the digits are all equal to zero, the block 86 and the E7 input are connected to a block 87 at which the "raw weight minus sign" memory is cleared. If they are not all equal to zero, the "raw weight minus sign" memory is set at a block 88. The outputs of the blocks 87 and 88 are connected to a block 89 at which a "factor light" memory which energizes an indicator light on the digital display 17 is updated. From the block 89, logic proceeds to an F1 input.

Referring to FIG. 2F, the F1 input is connected to a block 94 at which the new weight data from the scale 11 stored in the "raw weight" memory is subtracted from the filtered weight stored in a "filtered weight" memory. If the difference between the two weights is zero, then the weight reading has not changed. A check is made at a block 95 to see if the difference is zero. If so, a "current jitter" counter is cleared or reset to zero at a block 96 and the logic jumps to the G1 input. If the difference is non-zero, a check is made at a block 97 to see if the motion band is one or two least significant weight digits, as determined by the setting of a motion band switch in the static or internal switches. If, for example, the static switch is set to a motion band of two, the new or raw weight from the scale 11 is permitted to deviate from the filtered weight by one or two least significant digits without generating a motion signal. This minor deviation is what has been referred to as "jitter," if rapidly alternating between successive weight values.

From the block 97, the difference between the new or raw weight and the filtered weight is compared with the motion band at a block 98. If the difference is outside the band, the logic jumps to a G7 input, while if it is within the band a "current jitter" counter is incremented up by one at a block 99. A check is then made at a block 100 to see if a change has occurred in the sign of the result obtained when the new or raw weight was subtracted from the filtered weight at the block 94. If not, the logic jumps to an F8 input, while if it has, the "current jitter" counter is cleared at a block 101. This prevents revising or updating the filtered weight when the raw weight is oscillating about the filtered weight within the permissible motion band. The block 101 and the F8 input are connected to a block 102 at which the stored sign of the result from block 94 is updated. At a block 103, the required jitter count, as determined by the setting of one of the static switches, is subtracted from the current jitter count stored in the counter. A check is then made at a block 104 to see if the result is equal to zero. If so, the logic jumps to a G8 input, while if it is not equal to zero, the logic proceeds to the G1 input.

The G1 input is connected to a block 109 in FIG. 2G. The sign of the raw or new weight from the scale 11 is compared here with the sign of the filtered weight. A check is then made at a block 110 to see if the signs are the same. If they differ, the logic jumps to the G8 input while if they are the same, a check is made at a block 111 to see if a motion flag is clear. If the motion flag is not clear, a "current hit" counter is incremented at a block 112 and, subsequently, a check is made at a block 113 to see if the contents of the current hit counter equals two. If the count does equal two, the motion flag is cleared at a block 114 and the logic proceeds to the G7 input.

The G7 input is connected to a block 115 at which the "current hit" counter is cleared and the motion flag is set. The output of the block 115 and the G8 input are connected to a block 116 at which the contents of the "raw weight" memory are moved to the "filtered weight" memory for use by the arithmetic logic unit 15 in computing a net weight and an article value, unless motion is present. From the block 116, the raw weight sign is moved to a memory location for the filtered raw weight sign at a block 117 and the logic proceeds to a block 118. The logic also proceeds to the block 118 from the block 111 if the motion flag was clear at this point and from the block 113 if the current hit count did not equal two. At the block 118 a check is made to see if the digital tare timer, which was actuated by pushing any of the digit keys on the keyboard 13, has timed out. If the timer is on, the logic returns to A2 while if it has timed out, the "digital tare" memory is cleared at a block 119 and then the logic returns to the A2 input.

Returning for a moment to FIG. 2D, it will be noted that the block 75 has an output to an H1 input. Turning now to FIG. 2H, the H1 input is connected to a block 124 at which the tare weight stored in the "tare" memory is subtracted from the filtered weight stored in the "filtered weight" memory and the resulting net weight is stored in a "weight output" memory. A block 125 then checks to see if the apparatus 10 is in a "prepack" mode, as determined by a switch on the keyboard 13. If the "prepack" mode has been selected, the logic proceeds to an H6 input to prevent automatic clearing of the apparatus 10 after each successive article is weighed. If the apparatus 10 is not in the "prepack" mode, a check is made at a block 126 to see if one of the static or internal switches is set to disable the "0.1 pound clear" circuitry which automatically causes the apparatus 10 to be cleared when an article is removed from the scale 11. If so, the logic again proceeds to the H6 input, while if not a check is made at a block 127 to see if the net weight stored in the "weight output" memory is less than 0.1 pound. If the net weight is less than 0.1 pound, a check is made at a block 128 to see if a register or memory for the "0.1 pound" flag contains the number five. If so, the logic returns to the A1 input for recycling the apparatus 10. If not, the "0.1 pound" flag is cleared at a block 129. If the weight was not less than 0.1 pound at the block 127, then the "0.1 pound" flag is incremented at a block 130 to five at 200 millisecond intervals to note a 1 second time delay. The outputs of the blocks 129 and 130 and the H6 input are connected to a block 131 at which a check is made to see if one of the static switches is set to enable entry of tare weights. If not, the logic proceeds to an I1 input while if tare weight entry is enabled, a check is made at a block 132 to see if another static switch is set to make a tare weight entry mandatory. If the tare weight entry is not mandatory, the logic proceeds to the I1 input, while if it is mandatory a check is made at a block 133 to see if the "tare done" flag is set. If the flag is not set, the logic proceeds to a J8 input, while if it is set it proceeds to the I1 input.

The I1 input is connected to a block 138 in FIG. 2I. At the block 138, a check is made to see if one of the static switches is set to require closure of a factor key when price data is entered. If a factor key must be closed, a check is made at a block 139 to see if a factor key has been pressed on the keyboard 13. If none has been pressed, the logic jumps to the J8 input while if one has been pressed, a check is made at a block 140 to see if the "enter price" flag has been set. If the flag is not set, the logic jumps to an I8 input, while if it has been set the "enter price" flag is cleared at a block 141. The block 141 and the I5 input are connected to a block 142 at which the contents of the "price per pound" memory are moved to the "output" memory. The "price per pound" memory is then cleared at a block 143 and the logic proceeds to the I8 input.

If a factor key was not required at the block 138, the contents of the "price per pound" memory are moved to the "output" memory at a block 144. The block 144 and the I8 input are then connected to a block 145 at which a check is made to see if the net weight is minus. If the net weight is minus, the logic proceeds to the J8 input while if it is not minus, a check is made at a block 146 to see if the factor stored in the "factor" memory is equal to zero. If so, the logic proceeds to an I11 input. If the factor was not equal to zero, the factor stored in the "factor" memory is multiplied times the entered price at a block 147 to obtain an actual price per pound. The block 147 is connected along with the I11 input to a block 148 wherein the actual price per pound is multiplied times the net weight. This result is rounded off at a block 149. The rounded off final result is then stored in a "value output" memory at a block 150. A check is then made at a block 151 to see if the "motion" flag is set. If not, the logic proceeds to a J1 input. If the motion flag is set or if the logic has jumped to the I15 input, the "weight output" memory is blanked at a block 152. From the block 152 or if the logic has jumped to the I16 input, the "value output" memory is set to zero at a block 153. The logic then proceeds to a J4 input.

Turning to FIG. 2J, the J1 input is connected to a block 158 wherein a check is made to see if the computed value stored in the "value output" memory is less than $99.99. If it is greater than $99.99, the capacity of the digital display 17 and the capacity of the printer 18 are exceeded and a block 159 clears the "print" flag to abort a printing operation. The J8 input is also connected to the block 159 for aborting the printing operation. After the printing operation is aborted, the logic returns to the I16 input. If the value is not greater than $99.99 at the block 158, a check is made at a block 160 to see if the "print" flag is set. If not, the logic jumps to a J4 input, while if it is set, a "print command" signal is supplied to the printer 18 and the "print" flag is cleared at a block 161. The output of the block 161 and the J4 input are connected to a block 162 wherein a check is made to see if the printer is in the process of printing a label. If so, the logic proceeds to a J7 input, while if the printer is not in the process of printing a label, data is outputed from the output memories to the display and the printer at a block 163. Data is also outputed to various indicator lights on the digital display 17 at a block 164. The J7 input and the output of the block 164 are connected to a block 165 at which the "print command" signal is cleared and the logic then returns to the A2 input on FIG. 2A. This completes the operating sequence for the apparatus 10 for weighing and computing a value for articles.

The remaining drawings are concerned with details of the apparatus 10 for weighing and computing a value for articles and of modified embodiments of different portions of the invention. The scale 11 for generating digital gross or raw weight signals is preferably either of a mechanical spring type with an optical encoding chart or of a load cell type including an analog-to-digital converter. When the scale 11 is of the load cell type, it may be of the type disclosed in U.S. Pat. No. 3,709,309 which issued on Jan. 9, 1973 to Roger B. Williams, Jr., et al, and the disclosure of such patent is incorporated herein. In a mechanical spring scale, an encoding chart is mounted to move with a platter or platform on which an article is placed. The encoding chart includes a plurality of columns for generating a non-ambiguous code, such as a cyclic Gray code. A translator having a plurality of photocells is positioned adjacent one side of the Gray code chart while a light source is positioned on the opposite side of the chart. As the chart is moved by a weight placed on the scale platter, the weight output is applied to the interface and input data multiplexer 12.

Turning now to FIG. 3, details are shown of a translator 170 for reading an optical Gray code encoding chart in a mechanical spring scale and converting the Gray code to a BCD format. The translator 170 includes fourteen photocells 171a through 171n for reading 14 annular columns of transparent and opaque areas on the Gray code chart. A photocell 172 is also provided for continuously sensing the output of a light source which energizes the photocells 171a through 171n. The photocell 172 provides a reference voltage which will depend upon the light level. All 15 photocells 171a through 171n and 172 are connected to a positive bus 173 which is connected to a conventional regulated DC power supply. The bus 173 is also connected through a fixed resistor 174 to an electrical ground. The other end of each photocell 171a through 171n is connected through a potentiometer 175a through 175n, respectively, to a bus 176. The output of an operational amplifier 201 is also connected to the bus 176. The negative input to the amplifier 201 is connected to the bus 173 and also through a resistor 202 to the bus 176. The positive input to the amplifier 201 is connected through a resistor 203 to ground. The amplifier 201 regulates the voltage on the bus 176 with respect to the voltage on the bus 173. The junction between each of the photocells 171 and the connected potentiometer 175 is connected to the tap on such potentiometer 175 and also to a positive input to an associated one of fourteen comparators 177a through 177n. Thus, each of the potentiometers 175a through 175n is connected as a variable resistor between the photocells 171a through 171n, respectively, to the bus 176 for calibration purposes. The compensation photocell 172 is also connected through a potentiometer 178 connected as a variable resistor to the bus 176. The junction between the compensation photocell 172 and the potentiometer 178 is connected through a fixed resistor 179 and an operational amplifier 180 to a bus 181 which is connected in common to the negative inputs of the comparators 177a through 177n. A resistor 182 is connected between the bus 181 and a negative input to the operational amplifier 180. The resistors 179 and 182 determine the amplification factor of the amplifier 180. Thus, the comparators 177a through 177n continuously compare a reference voltage on the bus 181 with the outputs from the photocells 171a through 171n, respectively.

When an article is placed on a weighing platform on the scale 11, the encoding chart is moved to cause the signals applied from the photocells 171a through 171n to the comparators 177a through 177n to vary in a cyclic pattern until a steady state or balanced position is reached. In the balanced position, the comparators 177a through 177n will have outputs corresponding to the weight of the article. The outputs of the comparators 177a through 177n are connected to inputs of four shift registers 183-186 which provide a parallel-to-serial conversion of the Gray code. When a weight reading is to be stored in the memories 16, the data processor 14 and the interface 12 apply a latch signal on a terminal 187 which is connected through an RC delay network, including a series resistor 188 and a capacitor 188' connected to ground, and an inverter 189 to latch inputs on the four shift registers 183-186. The data processor 14 and interface 12 then apply clock signals on a terminal 190 which is connected through an RC delay network, including a series resistor 191 and a capacitor 191' connected to ground, and an inverter 192 in parallel to clock inputs on the four shift registers 183-186. The shift register 183 has an output connected through an inverter 193 to a "one's" output line 194, the shift register 184 has an output connected through an inverter 195 to a "two's" output line 196, the shift register 185 has an output connected through an inverter 197 to a "four's" output line 198 and the shift register 186 has an output connected through an inverter 199 to an "eight's" output line 200. When the shift registers 183-186 are latched and, subsequently, clocked, Gray code digits of weight data are shifted in series on the output lines 194, 196, 198 and 200 which are connected to the interface and input data multiplexer 12.

It is desirable for an operator of the apparatus 10 to have an indication that the scale 11 is properly zeroed. If the scale 11 is not zeroed, erroneous weight data will be supplied to the data processor 14, resulting in the computation of an incorrect value for a weighed article. A zero sensor 204 is connected to the two photocells 171a and 171b. The columns on the code chart read by the photocells 171a and 171b change between transparent and opaque areas at plus and minus ¼ least significant weight graduation from a zero on the chart. The zero sensor 204 detects when the outputs of the photocells 171a and 171b indicates that the scale is within ¼ graduation of zero and applies a signal on a zero light data line 204'. This signal causes an indicator light to be illuminated, as will be discussed in greater detail below.

Referring now to FIG. 4, the keyboard 13 and the interface and input data multiplexer 12 are shown in detail. Four eight-line to one-line data selector/multiplexers 205-208 are connected to four processor data lines 209-212, respectively. Address data is supplied in parallel to the multiplexers 205-208 over three lines 213-215. Each of the multiplexers 205-208 has eight input lines. Corresponding ones of the eight input lines for each of the multiplexers 205-208 is connected to the output data lines 209-212, respectively, depending upon an address received from the data processor 14 on the lines 213-215. Although it is not shown, each of the inputs to the multiplexers 205-208 is connected through a separate resistor to a positive voltage source. The resistors have been eliminated from the drawing to simplify FIG. 4. Thus, the inputs to the multiplexers 205-208 are normally maintained at a high logic level and are grounded when data is received through the closure of a switch.

The keyboard 13 includes 10 digit switches 216-225 which are normally open, momentary contact push button switches for selectively entering the digits zero through nine, respectively, into the data processor 14. The zeros digit switch 216 is connected to the first input line, the four digit switch 220 is connected to the second input line and the eight digit switch 224 is connected to the third input line to the multiplexer 205. The one digit switch 217 is connected to the first input line, the five digit switch 221 is connected to the second input line and the nine digit switch 225 is connected to the third input line to the multiplexer 206. The two digit switch 218 is connected to the first input line and the six digit switch 222 is connected to the second input line to the multiplexer 207. The three digit switch 219 and the seven digit switch 223 are connected to the first and second input lines to the multiplexer 208. The fourth input line to the multiplexer 205 is connected to a "clear" switch 226. The "clear" switch 226 is also connected through a Schmidt trigger 227 to apply a reset signal on a line 228 for clearing and resetting the data processor 14. The fourth input line to the multiplexer 206 is connected to a "per one pound" factor switch 229. The third input line to the multiplexer 207 is connected to a print switch 230 and the fourth input line is connected to a "per ½ pound" factor switch 231. The third input line to the multiplexer 208 is connected to a "tare entry" switch 232 and the fourth input line is connected to a "per ¼ pound" factor switch 233.

The fifth input lines to the multiplexers 205-208 are connected to the four weight data lines 194, 196, 198 and 200, respectively, from the scale 11. The sixth input line to the multiplexer 205 is connected to a "tare required" switch 234 which is mounted internal to the data processor 14. When a printer 18 is used with the apparatus 10, the printer is connected to apply a signal on a line 235 upon completion of a printing cycle. The line 235 is connected through a resistor 236 to ground and is also connected to the base of a transistor 237. The collector of the transistor 237 is connected to a positive voltage source while the emitter is connected through a resistor 238 to ground and is also connected to the seventh input line to the multiplexer 205. The transistor 237 maintains a continuous high voltage on the seventh input line to the multiplexer 205 when a printer is not connected to the line 235. The eighth and final input line to the multiplexer 205 is connected through a "tare enable" switch 239 which is mounted internal to the data processor 14. The setting of the switch 239 determines whether or not a tare weight can be entered into the apparatus 10. The sixth input line to the multiplexer 206 is connected to a "0.1 pound clear disable" switch 240. The setting of the switch 240 determines whether or not the memories 16 are cleared of price and tare weight data when an article is removed from the scale 11. The seventh input line to the multiplexer 206 is connected to a "prepack" mode switch 241 and also to a "prepack" mode data line 242. The eighth input line to the multiplexer 206 and also the eighth input lines to the multiplexers 207 and 208 are not used in the present embodiment of the apparatus 10.

The sixth input line to the multiplexer 207 is connected to a "jitter count" switch 243 which establishes a jitter count of two when the switch 243 is opened and a jitter count of three when the switch 243 is closed. Of course, the apparatus 10 may be modified so that other jitter counts can be established. The seventh input line to the multiplexer 207 is connected to an internal "digital tare enable" switch 244 which enables or disables manual entry of a tare weight through the digit keys 216-225 on the keyboard 13. The switch 244 does not affect automatic tare entry from the scale 11. The sixth input line to the multiplexer 208 is connected to a "motion band" switch 245. When the motion band switch 245 is open, the motion band is set at plus or minus one least significant weight digit while when the switch 245 is closed, the motion band is set at plus or minus two least significant weight digits. Finally, the seventh input line to the multiplexer 208 is connected to a "factor required" switch 246. When the "factor required" switch 246 is closed, one of the three factor switches 229, 231 or 233 must be closed before the apparatus 10 will compute and display a value for a weighed article. When the "factor required" switch 246 is opened or off, the apparatus 10 will assume that an entered price is a price per pound unless the price "per ½ pound" switch 231 is closed or the price "per ¼ pound" switch 233 is closed. The "tare enable" switch 239, the "factor required" switch 246, the "tare required" switch 234, the "0.1 pound clear disable" switch 240, the "jitter count" switch 243, the "motion band" switch 245 and the "digital tare enable" switch 244 are each mounted internally to the data processor 14. These switches are provided for selecting various optional modes of operation for the apparatus 10. The switches may, for example, consist of rock type switches which, when set, will remain in the set position. Normally, these switches will be set when the apparatus 10 is installed for a particular type of operation and thereafter will not need changing.

Data is supplied to the data processor 14 on the data lines 209-212 from the multiplexers 205-208, respectively, when the data processor provides address data on the lines 213—215. The address data on the lines 213-215 is modified by the data processor 14 to simultaneously scan corresponding ones of the eight input lines to the multiplexers 205-208. With the exception of the fifth input lines to the multiplexers 205-208, independent data is provided to the data processor 14 on each of the four data lines 209-212 indicative of various conditions or settings of switches. When the fifth input lines to the multiplexers 205-208 are addressed, the four weight data lines 194, 196, 198 and 200 from the scale 11 are connected to the processor data lines 209-212. At this time, the data processor 14 applies signals on the translator latch terminal 187 and clocks Gray code weight data by means of the translator clock terminal 190 through the multiplexers 205-208 to the processor data lines 209-212.

Figure 5:
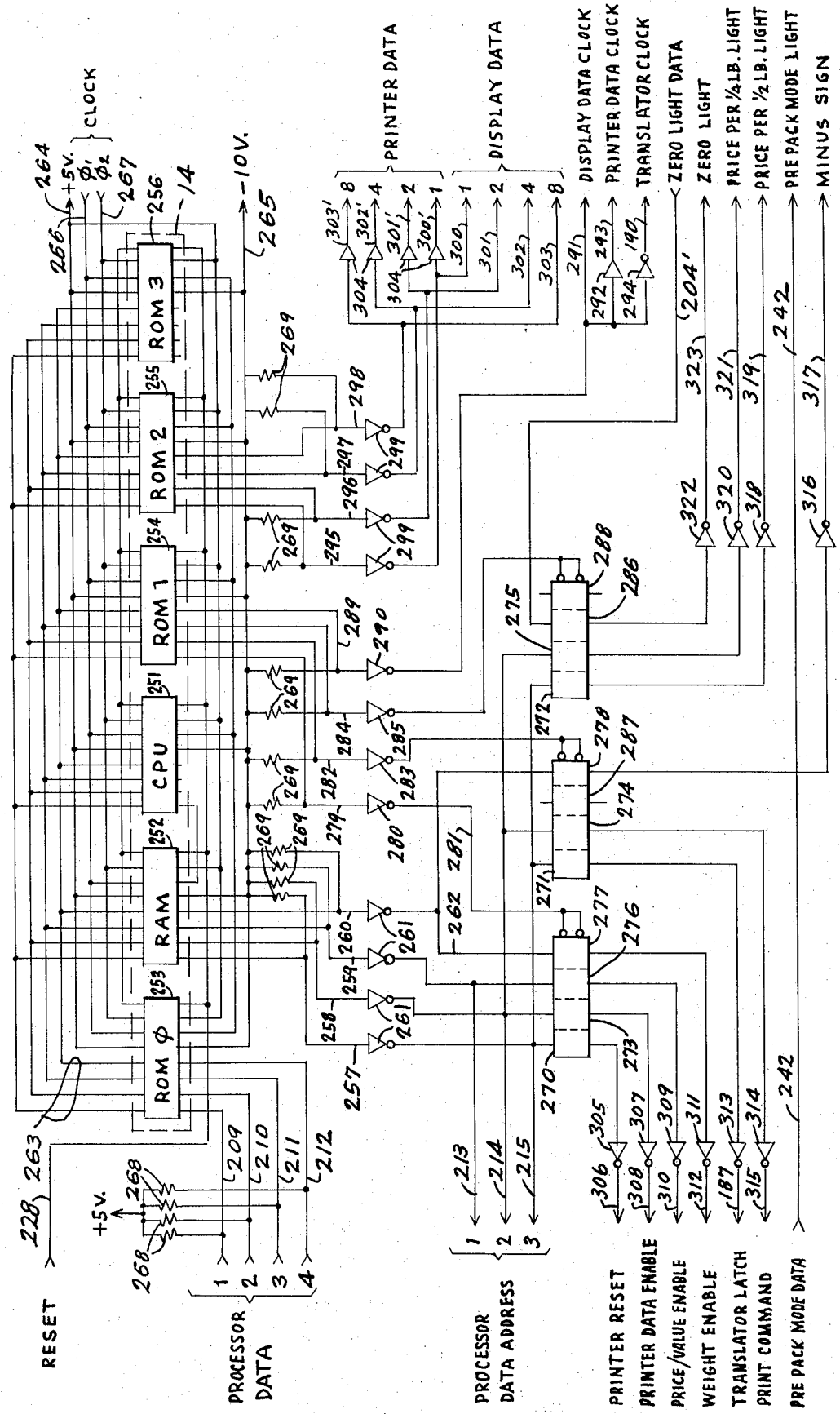
FIG. 5 is a detailed schematic logic circuit diagram of a data processor, digital memories and interface for use in apparatus for weighing and computing a value for articles in accordance with the present invention.

Referring now to FIG. 5, the data processor 14 and a portion of the interface 12 are shown in detail. The data processor 14 includes a central processing unit (CPU) 251, a random access memory (RAM) 252 and four read only memories (ROM) 253-256. The data processor 14 is preferably what is known in the art as a "microcomputer" or a "microprocessor" and is composed entirely of large scale integrated circuits. The data processor 14 may, for example, comprise a Model MCS—4 microcomputer set manufactured by Intel Corporation of Santa Clara, Calif. In such case, the CPU 251 would then be an Intel type 4004 integrated circuit, the RAM 252 would be an Intel type 4002 Integrated circuit and the ROM's 253-256 each would be Intel type 4001 integrated circuits. However, it will be appreciated that other commercially available integrated circuit microcomputers will also operate in the apparatus 10 in accordance with the principles described herein.

The ROM's 253-256 store a fixed program for controlling the operating sequence of the apparatus 10. The program, which will be readily apparent to those of ordinary skill in the microcomputer programming art, causes data to be supplied to the CPU 251 for use in computing a net weight and a value for each weighed article and after a value is computed, supplies data to the display 17 and to a printer 18, when used. The data used by the microcomputer data processor 14 consists of data received on the lines 209-212 from the scale 11, from the keyboard 13 and from the printer 18. Four data and address outputs 257-260 from the RAM 252 are connected respectively through four inverters 261 to the three address lines 213-215 and to a data line 262. Address information and other data supplied from the RAM 252 to the address lines 213-215 controls data supplied to the data processor 14 and data supplied from the data processor 14 to the scale 11, to the digital display 17 and the printer 18. External data from, for example, the keyboard 13 and the scale 11 is supplied to the data processor 14 on the four data lines 209-212 which are connected to the ROM 253. At the proper time interval, the external input data on the lines 209-212 passes through the ROM 253 onto four input/output data busses 263 which are connected in parallel with the four ROM's 253-256, the RAM 252 and the CPU 251.

The data processor 14 also includes inputs for supplying the necessary operating voltages and clock signals. For example, the positive terminal from a 5-volt power source is connected to a bus 264 and the negative terminal of a 10-volt power source is connected to a bus 265, each of which are connected in parallel to the CPU 251, the RAM 252 and the ROM's 253-256. Clock pulses are also alternately supplied in parallel to the CPU 251, the RAM 252 and the ROM's 253-256 over two lines 266 and 267 which are connected to a conventional two-phase, non-overlapping clock pulse source. The data input lines 209-212 to the ROM 253 are each connected through a resistor 268 to the positive terminal of a 5-volt source. Thus, the input lines 209-212 are normally maintained positive and selectively become negative when data is received from the interface and multiplexer 12. Output data from the data processor 14 is supplied from the RAM 252 and the ROM's 254 and 255. Each of the output terminals from the RAM 252 and the ROM's 254 and 255 are connected through a resistor 269 to the negative terminal 265.

After input data is supplied on the lines 209-212 to the data processor 14, a net weight is computed and, from the net weight and an entered price per unit weight, a value is computed. The net weight and value are computed using conventional digital techniques. After the computation is completed, data is outputed from the data processor 14. In addition to input data address information, the RAM 252 also outputs other data on the outputs 257-259. The output 257 is connected through one of the inverters 261 to three parallel bistable latches 270-272. The output 258 from the RAM 252 is connected through one of the inverters 261 to three parallel bistable latches 273-275. The output 259 from the RAM 252 is connected through one of the inverters 261 to a bistable latch 276. As previously discussed, the address lines 213-215 are also connected to the outputs of the inverters 261 connected to the outputs 257-259 from the ROM 253. The fourth data output 260 from the RAM 252 is connected through a fourth of the inverters 261 and the line 262 to two bistable latches 277 and 278. The ROM 254 has an output 279 which is connected through an inverter 280 to a line 281 for simultaneously strobing the bistable latches 270, 273, 276 and 277. When the latches 270, 273, 276 and 277 are strobed, they take on one of two logic states determined by the current outputs from the RAM's 252. A second output 282 from the ROM 254 is connected through an inverter 283 for strobing the bistable latches 271, 274 and 278. When a strobe signal is applied to these latches, the outputs 257, 258 and 260 from the RAM 252 are stored, respectively, in the latches 271, 274 and 278. The ROM 254 has a third output 284 which is connected through an inverter 285 to strobe the bistable latches 272 and 275 to store, respectively, data appearing on the outputs 257 and 258 from the RAM 252. At the same time, the output from the inverter 285 strobes a bistable latch 286 to store data on the zero light data line 204- (from FIG. 3). The bistable latches are commercially available in an integrated circuit form typically with four latches in a package. Therefore, the output from the inverter 283 also strobes a spare bistable latch 286 and the output from the inverter 285 strobes a spare bistable latch 288. The spare bistable latches 286-288 may be used for storing additional output data in modified embodiments of the apparatus 10.

The ROM 254 also has a fourth output 289 which is connected through an inverter 290 to an output terminal 291 for supplying clock pulses to clock data to the digital display 17. The output from the inverter 290 is also connected through an amplifier 292 to a terminal 293 for simultaneously supplying clock pulses to the printer 18 and is connected through an inverter 294 to the translator clock terminal 190 for clocking weight data from the scale 11 to the multiplexers 205-208 in FIG. 4 when the translator 170 is latched. The ROM 255 supplies tare weight, price per unit weight, net weight and computed value data from the data processor 14 to the digital display 17 and to the optional printer 18. The ROM 255 has four outputs 295-298 which are connected through four inverters 299 to output terminals 300-303 for sequentially supplying output data in a BCD format to the digital display 17. The outputs 300-303 are also connected through four amplifiers 304 to corresponding outputs 300' through 303' for supplying the same data to the printer 18.

The remaining outputs for supplying data to the keyboard 13, the digital display 17 and the printer 18 are taken from the bistable latches 270-278 and 286. The bistable latch 270 has an output connected through an inverter 305 to a terminal 306 for supplying a signal to reset the printer 18. The bistable latch 273 has an output connected through an inverter 307 to a terminal 308 for supplying a signal to enable the printer 18 to read data on the data outputs 300' through 303' from the data processor 14. The bistable latch 276 has an output connected through an inverter 309 to a terminal 310 for enabling both the digital display 17 and the printer 18 to store data appearing on the outputs 300' through 303' as price and value data. The bistable latch 277 is connected through an inverter 311 to a terminal 312 for enabling both the digital display 17 and the printer 18 to recognize and store data appearing on the outputs 300' through 303' as weight data. The bistable latch 271 is connected through an inverter 313 to the translator latch terminal 187 for enabling data to be supplied from the scale 11 through the data multiplexers 205-208 to the data processor 14. The bistable latch 274 is connected through an inverter 314 to a terminal 315 for supplying a signal to command the printer 18 to print a label or other record of the data supplied from the data processor 14. The bistable latch 278 has an output connected through an inverter 316 to a terminal 317 for supplying a signal to the digital display 17 and the printer 18 when the weight data is negative. The bistable latch 272 has an output connected through an inverter 318 for applying a signal on a terminal 319 which illuminates a light on either the keyboard 13 or the display 17 to indicate when the weight factor has been set to "per ½ pound" by the switch 231. The bistable latch 275 has an output connected through an inverter 320 to a terminal 321 which is similarly connected to illuminate a "per ¼ pound" indicator light when the per ¼ pound factor switch 233 is actuated. The "per ½ pound" indicator light is preferably mounted within or adjacent the "per ½ pound" factor switch 231 and the "per ¼ pound" indicator light is preferably mounted within or adjacent the "per ¼ pound" factor switch 233 for indicating when the apparatus 10 is operated in either of these modes. The bistable latch 287 is connected through an inverter 322 to a terminal 323 for illuminating a zero light when the scale 11 is properly zeroed.

Referring now to FIG. 6, the digital display 17 is shown in detail. The digital display 17 includes 11 seven-segment indicators 330-340 which may be Numitrons or other conventional types having seven segments which are selectively illuminated by means of, for example, incandescent lamps, light emitting diodes or gas discharge tubes. The three indicators 330-332 indicate hundredths, tenths and units digits of price data randing from $.01 up to $9.99. The four indicators 333-336 indicate hundredths, tenths, units and tens digits of weight data ranging from 0.01 pound up to the maximum capacity of the scale 11 which has previously been established as 25.14 pounds, the maximum capacity of the Gray code optical encoding chart in the scale 11. The remaining four indicators 337-340 indicate four digits of computed value in hundredths, tenths, units and tens digits, respectively, from $.01 up to $99.99.

Eleven BCD-to-seven-segment decoder/drivers 341-351 are connected, respectively, to selectively energize the segments in the 11 indicators 330-340. BCD data is supplied to the decoder/drivers 341-351 from eight series-to-parallel shift registers 352-359. The "ones" bits for the three price decoder/drivers 341-343 and the four value decoder/drivers 348-351 are stored in the shift register 352 and the four "ones" bits for the four weight decoder/drivers 344-347 are stored in the shift register 353. The three "twos" bits for the decoder/drivers 341-343 and the four "twos" bits for the value decoder/drivers 348-351 are stored in the register 354 and the four "twos" bits for the weight decoder/drivers 344-347 are stored in the register 355. The three "fours" bits for the price decoder/drivers 341-343 and the four "fours" bits for the value decoder/drivers 348-351 are stored in the register 356 and the four "fours" bits for the weight decoder/drivers 344-347 are stored in the register 357. Finally, the three "eights" bits for the price decoder/drivers 341-343 and the four "eights" bits for the value decoder/drivers 348-351 are stored in the shift register 358 and the four "eights" bits for the four weight decoder/drivers 344-347 are stored in the register 359. For simplicity, the 44 connections between the shift registers 352-359 and the decoder/drivers 341-351 have been omitted from FIG. 6.

The data output terminal 300, which receives the "ones" bits of BCD weight data from the data processor 14, is connected in parallel to inputs to the two shift registers 352 and 353. Similarly, the "twos" output terminal 301 from the data processor 14 is connected in parallel to the two shift registers 354 and 355, the "fours" output terminal 302 is connected in parallel to the two shift registers 356 and 357 and the "eights" output terminal 303 is connected in parallel to inputs to the two shift registers 358 and 359. The price/value enable terminal 310 (from FIG. 5) is connected in parallel to enable the four registers 352, 354, 356 and 358 which store the price and value data. The price/value enable terminal 310 is also connected to a NAND gate 360. The display data clock terminal 291 (from FIG. 5) is connected to a second input of the NAND gate 360. The output of the NAND gate 360 is connected through an inverter 361 to clock inputs on the registers 352, 354, 356 and 358. Thus, when the bistable latch 276 is set to apply a signal on the price/value enable terminal 310, price and value data is serially shifted into the registers 352, 354, 356 and 358. Similarly, the weight enable terminal 312 and the data clock terminal 291 are connected to a NAND gate 362. The output of the NAND gate 362 is connected through an inverter 363 to clock inputs on the weight shift registers 353, 355, 357 and 359 for shifting weight data from the data terminals 300-303 into such registers. Once stored in the registers 352-359, the price, weight and value data will be maintained until revised by the data processor 14. Therefore, this data will appear continuously on the indicators 330-340.

In some instances, the weight displayed on the indicators 333-336 will have a negative value. The weight will, for example, have a negative value when a tare weight has been manually entered through the keyboard 13 and an article has not yet been placed upon the scale 11. In this case, the entered tare weight will appear on the indicators 333-336. However, the negative weight will be limited to a relatively small value and in all cases will be no greater than 9.99 pounds. The tens weight indicator 336 is used for indicating the presence of a negative value. The minus sign terminal 317 (from FIG. 5) is connected to energize the tens weight indicator 336 to illuminate a minus sign, or the center one of the seven segments.

As previously discussed, the actuation of the "tare entry" key 232 on the keyboard 13 causes either a digital tare weight entered manually through the digit keys 216-225 to be stored in the digital memories 16 or, if one or more of the digit keys 216-225 has not been actuated within a predetermined time interval of actuation of the tare entry key 232, a weight from the scale 11 is automatically entered or stored in the memories 16. For an automatic entry of tare weight, the article container is initially placed on the scale 11 and the weight of such container will appear on the weight indicators 333–336. When the tare entry key is pushed, the displayed weight is stored as a tare weight. The net weight is subsequently calculated by the data processor 14 and such net weight is stored in the shift registers 353, 355, 357 and 359 for display on the weight indicators 333–336. Since the weight of the empty containers on the scale 11 and the tare weight are identical, the net weight will now be zero and a series of zeros will appear on each of the indicators 333–336. Of course, the computed value will also be zero since the net weight is zero and the value indicators 337–340 will also display zeros. When a price or tare weight number is entered through the digit keys 216–225 on the keyboard 13, such number appears on the price indicators 330–332. If the tare entry key 232 is then actuated before the predetermined time interval has elapsed, one or more of the digits shown on the price display are shifted into the tare memory, clearing the price memory, and the tare weight will appear as a negative quantity on the weight indicators 333–336, unless an article is on the scale in which case a net weight is displayed. Or, when an article is subsequently placed in a container and on the scale 11, a net weight will be computed and displayed on the weight indicators 333–336. In many cases, it is only necessary to have a tare weight ranging from 0.01 pound up to 0.09 pound. In such case, only the digit appearing on the least significant price indicator, or the hundredths price indicator 330, is shifted into the hundredths position of the tare weight memory for display on the hundredths pound indicator 333.

The system or method for entering tare weight has been described above embodied in specific apparatus 10 which includes an integrated circuit microcomputer. However, the system for manually and automatically entering tare weight may also be used with other types of scales which require a tare weight for measuring net weights. Turning now to FIG. 7, a modified embodiment is shown of apparatus 370 for entering a tare weight into a scale system either manually from a digital keyboard or automatically from the scale itself. The scale in which the apparatus 370 is used includes four four-bit registers 371–374 for storing in a BCD format four weight digits. The register 371 stores the hundredths or .0W gross weight digit, the register 372 stores the tenths or .W gross weight digit, the register 373 stores the units or W. gross weight digit and the register 374 stores the tens or W0. gross weight digit as measured by the scale. The scale also includes four four-bit registers 375–378 for storing four digits of tare weight. The register 375 stores the hundredths or .0T digit, the register 376 stores the tenths or .T digit, the register 377 stores the units or T. digit and the register 378 stores the tens or T0. digit of the tare weight. The scale is then provided with any conventional means for computing a net weight from the gross weight stored in the registers 371–374 and the tare weight stored in the registers 375–378.

The apparatus 370 is sequenced by means of a clock 379. The clock 379 is provided with four outputs which have four-phase and non-overlapping pulse trains. The pulse trains will hereinafter be referred to as $\phi 1$ through $\phi 4$. The clock pulses in the four phases $\phi 1 - \phi 4$ may, for example, each have a 2 microsecond pulse width and be repeated each 16 microseconds. The pulses for the successive phases are delayed by 2 microseconds from the previous phase so that they are non-overlapping.

A keyboard (not shown) is provided with a tare entry key having an output connected through an inverter 380 to a terminal 380' and with nine digit keys having outputs connected to nine digit inputs 381. The tare entry key and the digit keys are normally maintained at a high voltage level and ground the appropriate inputs to the apparatus 370 when closed. When one of the digit keys is pushed, a signal is applied over the corresponding input 381 to an OR gate 382 which starts a monostable or one shot multivibrator 383. Once started, the multivibrator 383 remains on for a predetermined time interval, such as 1.6 seconds, and subsequently shuts off. While on, the multivibrator 383 has a high $Q_T$ output and a low $\bar{Q}_T$ output and when off, the multivibrator 383 has a low $Q_T$ output and a high $\bar{Q}_T$ output. At the same time a signal on one of the digit inputs 381 triggers the multivibrator 383, the signal is applied to a decimal-to-BCD encoder 384. The BCD output from the encoder 384 is applied to the input of a four-bit digital tare memory 385. Before the multivibrator 383 is triggered by the actuation of a digit key, the low $Q_T$ output holds a flip-flop 386 clear, resulting in a low $Q_4$ output and a high $\bar{Q}_4$ output and holds a flip-flop 388 clear, resulting in a low $Q_3$ output.

The apparatus 370 remains in the above state until the multivibrator 383 triggers, causing $Q_T$ to go high and until the next $\phi 1$ clock pulse, which causes a NAND gate 387 to set the flip-flop 388 to have a high $Q_3$ output. The $Q_3$ output is applied to an AND gate 389 and to a NAND gate 390. Upon the occurrence of the next clock pulse, which is a $\phi 2$ pulse, the NAND gate 390 produces an output for setting the flip-flop 386 to produce a high $Q_4$ output. The high $Q_3$ and $Q_4$ outputs are applied to the AND gate 389 which strobes the digital tare memory 385, thereby storing the BCD equivalent of the energized digit input 381 from the keyboard. Upon the occurrence of the $\phi 3$ clock pulse, a NAND gate 391, which has a second input connected to the high $Q_4$ output from the flip-flop 386, applies a pulse to a OR gate 392 for clearing the flip-flop 388, thereby removing the strobe signal from the memory 385. The OR gate 392 also has an input from the $Q_T$ output of the multivibrator 383. The clock 379 will continue to cycle without further effect until either the tare entry key is pushed or the multivibrator 383 has timed out.

When the tare entry key is pushed to apply a signal on the input terminal 380', the apparatus 370 is sequenced to shift either the digit stored in the memory 385 into the .0T tare weight register 375, if the multivibrator 383 is on, or to shift the contents of the gross weight registers 371–374 into the tare weight registers 375–378, respectively. While the tare entry key is open, the output from the inverter 380 maintains flip-flops 393 and 395 clear such that the flip-flop 393 has a high $\bar{Q}_1$ output and a low $Q_1$ output and the flip-flop 395 has a high $\bar{Q}_2$ output and a low $Q_2$ output. When the tare entry key is closed to ground the input to the inverter 380, the next $\phi 1$ clock pulse sets the flip-flop 395. The $Q_2$ output from the flip-flop 395 and the $\bar{Q}_1$ output from the flip-flop 393, both of which are now high, are applied to an AND gate 396. The next $\phi 2$ clock pulse then passes through the gate 396 to clear the tare weight registers 376-378. The high $Q_2$ output from the flip-flop 395 also enables an AND gate 397 so that the next $\phi 3$ clock pulse sets the flip-flop 393 to a high $Q_1$ output and a low $\overline{Q}_1$ output. The now high $Q_1$ and $Q_2$ outputs from the flip-flops 393 and 395, respectively, pass through an AND gate 398 to enable three AND gates 399, 400 and 414. The AND gate 399 has a second input connected to the $Q_T$ output of the multivibrator 383 and the AND gate 400 has a second input connected to the $\overline{Q}_T$ output from the multivibrator 383. Assuming that a digitaltare weight has been entered from a keyboard and the multivibrator 383 is still on, the AND gate 399 will now apply a signal in parallel to enable four AND gates 401–404. When the AND gates 401–404 are enabled by an output from the AND gate 399, the four bits of the BCD tare weight digit stored in the memory 385 pass through the AND gates 401–404 and through four OR gates 405–408 to inputs to the tare weight register 375.

If either a digit has not been entered on one of the nine digit inputs 381 to turn on the multivibrator 383 or if the multivibrator 383 has timed out, the multivibrator 383 will apply a high $Q_T$ output to the AND gate 400. When the AND gate 398 applies a signal to the second input of the AND gate 400, the AND gate 400 enables four ANd gates 409–412. When the AND gates 409–412 are enabled, the .0W or hundredths weight digit from the gross weight register 371 is passed through the OR gates 405–408 to the input to the hundredths tare weight register 375. The output of the AND gate 400 is also connected to an AND gate 413. Upon the occurrence of a $\phi 4$ clock pulse, the output of the AND gate 398 and the clock pulse enable the AND gate 414 to produce an output for strobing the tare weight register 375. At this time, either the contents of the memory 385 or of the register 371 are stored in the register 375, depending upon the state of the multivibrator 383. If the multivibrator 383 is not on so that the gate 400 has an output, the AND gate 413 simultaneously produces a clock pulse which strobes the tare weight registers 376-378. When the tare weight registers 375–378 are strobed, tare weight data is stored from the gross weight registers 372–374. As the clock 379 continues to cycle, the next pulse is a $\phi 1$ pulse. This clock pulse is passed through a NAND gate 415, which is enabled by the $Q_1$ output from the flip-flop 393, and an OR gate 416 to clear the flip-flop 395. When the flip-flop 395 is cleared, the high $\overline{Q}_2$ output and the high $Q_1$ output from the flip-flop 393 cause an AND gate 417 to generate an output which clears the digital tare memory 385. Then when the enter tare key is released, the low output 380' from the inverter 380 clears the flip-flop 393 and maintains the flip-flop 395 cleared. This completes the operating sequence of the apparatus 370. Although the apparatus 370 has been provided with only a single memory 385 for storing only the hundredths digit of a tare weight manually entered from a keybaord, it will be appreciated that the apparatus may be readily adapted for manually entering additional digits of tare weight.

The system or method for digitally filtering the weight data received from the scale 11 has also been described above in a specific embodiment of the apparatus 10. However, it will be appreciated that the digital filtering technique may be adapted for use in scales which do not include an integrated circuit microcomputer and may also be adapted for filtering digital data entered into other types of digital systems besides scales and weight measuring apparatus. Referring now to FIG. 8, a modified embodiment is shown of apparatus 425 for filtering digital data in accordance with the above-described embodiment of the invention. The filtering operation is controlled by means of a four-phase clock 426 which generates four sequential, non-overlapping clock outputs $\phi_1$ through $\phi_4$. During the first clock pulse of the $\phi_1$ output of the clock 426, new or raw data is clocked into a four-bit storage register 427. The new data stored within the register 427 is applied to the input of a filtered data register 428 and also to an "A" input of a comparator 429. The filtered data presently stored within the register 428 is applied in parallel to a "B" input to the comparator 429 and also to four filtered data output lines 430. input is The comparator 429 compares 429 compares the A and B inputs using conventional digital logic circuitry. If the difference between the A and B is greater than one, the comparator applies a signal on an output 431. If the difference between the A and B inputs is equal to one, the comparator 429 applies a signal on a second output 432. If the A and B inputs are equal, the comparator 429 applies a signal on a third output 433. The comparator 429 also has an output 434 which indicates the sign of the difference between A and B. If A is greater than or equal to B, a signal will be applied by the comparator 429 on the output 434. If A is less than B, no signal will be applied on the output 434.

After the $\phi_1$ clocl pulse is applied to store the raw weight data in the register 427, a $\phi_2$ clock pulse is applied to enable four AND gates 435–438. The output 431 from the comparator 429 is connected to the second input of the gate 435. If the difference between the A and B inputs to the comparator 429 is greater than one, the signal applied on the output 431 passes through the AND gate 435 and an OR gate 439 to clock the new data stored in the register 427 into the filtered data register 428. The clock output from the OR gate 439 also passes through a delay circuit 440 and an OR gate 441 to clear a counter 442. If, on the other hand, the difference between A and B is equal to one, the comparator 429 applies a signal on the output 432 which passes through the enabled AND gate 436 to increment the counter 442. If A is equal to B, the comparator 429 applies a signal on the output 433 which passes through the enabled AND gate 437 and the OR gate 441 to clear the counter 442. The sign output 434 from the comparator 429 is applied to one input of an exclusive OR gate 443. The second input to the exclusive OR gate 443 is connected to the Q output of a flip-flop 444. The flip-flop 444 is set in response to the $\phi_3$ clock pulse to the true or false logic level of the sign output 434 from the comparator 429. Therefore, during the $\phi_2$ clock pulse, the flip-flop 444 will have a logic state dependent upon the state of the output 434 from the comparator 429 during the previous cycle of the clock 426. If the output 434 from the comparator 429 changes logic levels, the exclusive OR gate 443 will apply a signal through the enabled AND gate 438 and the OR gate 441 to clear the counter 442.

The counter 442 has an output 445 connected to one input of an AND gate 446. The second input to the AND gate 446 is connected to the $\phi_4$ output from the clock 426. The output 445 from the counter 442 has arbitrarily been selected as a count three output. Thus, a signal is applied on the output 442 whenever the counter 442 is incremented up to three. When the counter 442 is incremented to three to apply a signal on the output 445, the $\phi_4$ clock pulse passes through the AND gate 446 and the OR gate 439 to clock the new data stored in the register 427 into the filtered data register 428. The clock pulse also passes through the delay circuitry 440 and the OR gate 441 to clear the counter 442.

From the above description, it will be noted that the new or raw data stored in the register 427 is permitted to fluctuate or jitter within plus or minus one of the filtered data stored in the register 428 without revising the filtered data during each cycle of the clock 426. The filtered data stored within the register 428 is revised only when the contents of the registers 427 and 428 deviate by either one for three consecutive cycles of the clock 426 or by greater than one on one cycle of the clock 426. If the contents of the register 427 oscillate alternatively to plus and minus one digit of the contents of the filtered data register 428 or to the same value as is stored in the filtered data register 428, then the counter 442 is cleared on each clock cycle so that the filtered data stored in the register 428 is not updated. It will be appreciated that the apparatus 425 may be adapted for use in entering weight readings from a scale into a filtered weight memory or for entering other types of digital data into memories with the elimination of jitter from the data. It will also be apparent that filtering band may be expanded to accommodate a wider jitter range merely by modifying the comparator 429. For example, the outputs 431 and 432 may be generated, respectively, when A-B is greater than ±2 and when A-B equals ±1 or ±2.

Although specific embodiments of the invention have been described above, it will be appreciated to those skilled in the art that various modifications and changes may be made without departing from the spirit and the scope of the claimed invention. Furthermore, it will be appreciated that in the broadest aspect of the claims, the invention may be adapted to various types of apparatus.

What I claim is:

1. A computing scale comprising, in combination, weighing scale means for generating a digital weight signal, a first digital memory, data input means having a plurality of digit keys for supplying data to said first memory and having a tare entry key, timing means for measuring a predetermined time interval, means responsive to the closure of any of said digit keys for starting said timing means, a second digital memory for storing a tare weight, means responsive to the closure of said tare entry key while said timer is on for shifting at least one digit from said first memory into said second memory, means responsive to the closure of said tare entry key while said timer is off for storing the digital weight signal from said scale means in said second memory, and means responsive to said digital weight signal and to the contents of said second memory for computing a net weight of an article weighed on said scale means.

2. A computing scale, as set forth in claim 1, and including means for clearing said first digital memory after said timer turns off.

3. A computing scale, as set forth in claim 1, wherein said means responsive to the closure of said tare entry key while said timer is on shifts only the last digit stored in said first memory to said second memory, and including means for clearing said first memory after such last digit is shifted to said second memory.

4. In weighing and value computing apparatus having a scale for generating digital data corresponding to the weight of an article and a keyboard having a plurality of digit keys for manually entering digits of price and tare weight data and a tare entry key, circuitry for storing data in price and tare weight memories comprising, in combination, a temporary tare weight register, means responsive to the closure of one of said digit keys for shifting such digit into both said price memory and said temporary tare weight register, timing means for measuring a predetermined time interval, means responsive to the closure of any of said digit keys for starting said timing means, means responsive to the closure of said tare entry key while said timer is on for shifting at least one digit from said temporary tare weight register into said tare weight memory, and means responsive to the closure of said tare entry key while said timer is off for storing digital weight data from said scale in said tare weight memory.

5. Circuitry for storing data in price and tare weight memories in weighing and value computing apparatus, as set forth in claim 4, and including means responsive to closure of said tare entry key for clearing said price memory.

6. Circuitry for storing data in price and tare weight memories in weighing and value computing apparatus, as set forth in claim 5, and including means for clearing said temporary tare weight register after said timer turns off.

* * * * *